United States Patent
Yoshikawa

(10) Patent No.: US 10,778,898 B2
(45) Date of Patent: Sep. 15, 2020

(54) IMAGING CONTROL APPARATUS FOR CONTROLLING TO DISPLAY FOCUS INFORMATION AND CONTROL METHOD FOR CONTROLLING IMAGING CONTROL APPARATUS

(71) Applicant: CANON KABUSHIKI KAISHA, Tokyo (JP)

(72) Inventor: Akio Yoshikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/294,776

(22) Filed: Mar. 6, 2019

(65) Prior Publication Data

US 2019/0289220 A1    Sep. 19, 2019

(30) Foreign Application Priority Data

Mar. 19, 2018    (JP) .................................. 2018-050655

(51) Int. Cl.
*H04N 5/232*    (2006.01)
(52) U.S. Cl.
CPC . *H04N 5/232945* (2018.08); *H04N 5/232127* (2018.08)
(58) Field of Classification Search
CPC ....... H04N 5/232945; H04N 5/232127; H04N 5/23296
See application file for complete search history.

(56) References Cited

U.S. PATENT DOCUMENTS

| | | | | |
|---|---|---|---|---|
| 9,036,073 | B2 * | 5/2015 | Yoshida | H04N 5/23212 348/345 |
| 10,044,943 | B2 * | 8/2018 | Saito | H04N 5/23296 |
| 2016/0295120 | A1 * | 10/2016 | Ota | H04N 5/23222 |
| 2018/0139394 | A1 * | 5/2018 | Ota | H04N 5/23216 |

FOREIGN PATENT DOCUMENTS

| JP | 2016-197180 A | 11/2016 |
|---|---|---|
| JP | 2016-197182 A | 11/2016 |

\* cited by examiner

*Primary Examiner* — Padma Haliyur
(74) *Attorney, Agent, or Firm* — Canon U.S.A., Inc. IP Division

(57) ABSTRACT

An apparatus includes an acquisition unit configured to acquire information regarding a focus detection position in an image captured by an image capturing unit, a display control unit configured to perform control to enlarge and display a part of the image on a display unit, and a control unit configured to perform control to, in a case where the part of the image is enlarged and displayed, display an enlargement guide indicating a position of the enlargement relative to an entire the image, wherein the control unit performs control to, in a case where the focus detection position is outside a range of the enlarged display part of the image, produce on the enlargement guide a display indicating a location of the focus detection position.

23 Claims, 13 Drawing Sheets

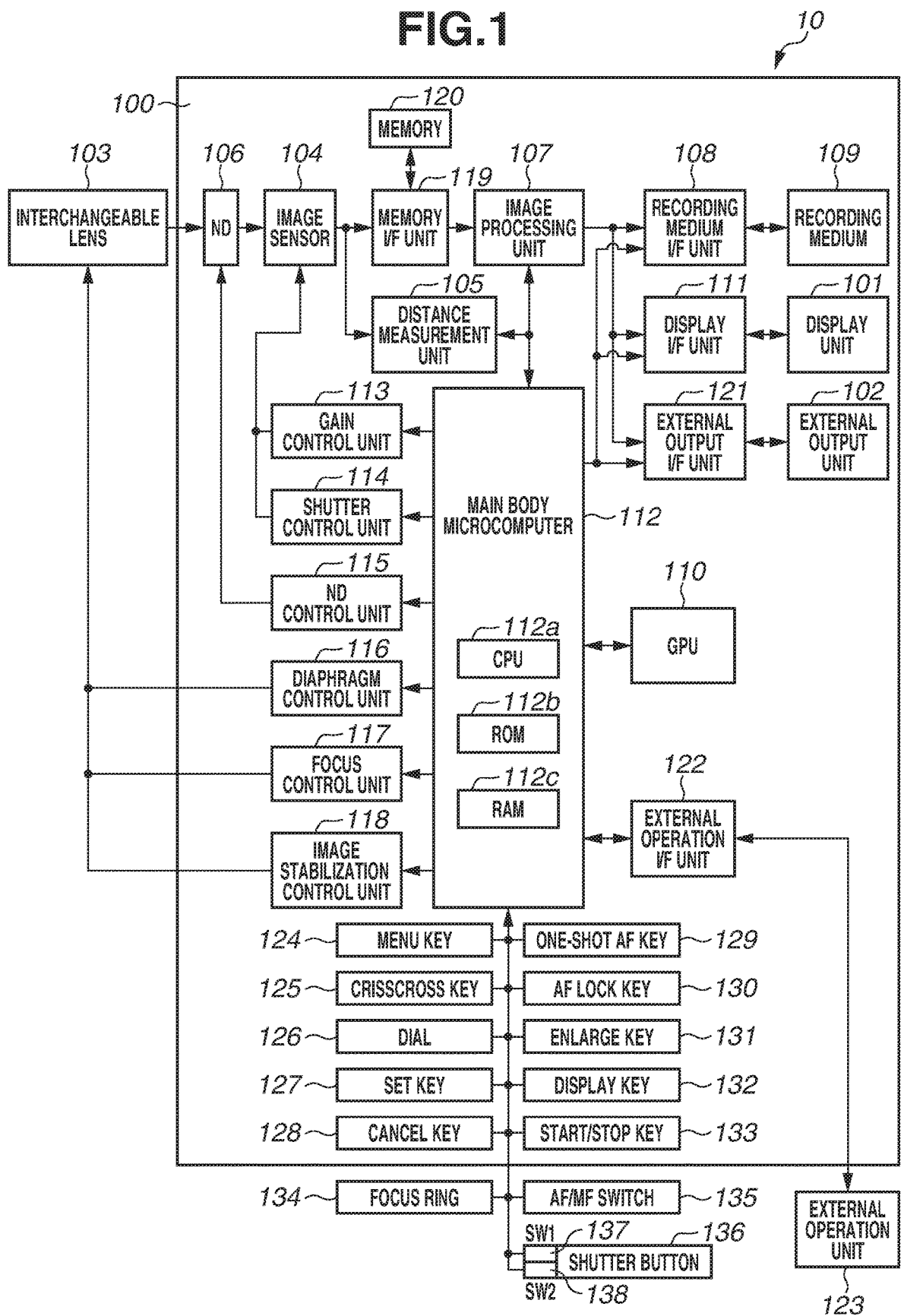

FIG.2A

NON-IMAGING PLANE PHASE DIFFERENCE METHOD: PIXEL CONFIGURATION

| R  | Gr | R  | Gr | R  | Gr | R  | Gr | R  | Gr |
|----|----|----|----|----|----|----|----|----|----|
| Gb | B  | Gb | B  | Gb | B  | Gb | B  | Gb | B  |

FIG.2B

IMAGING PLANE PHASE DIFFERENCE METHOD: PIXEL CONFIGURATION

| R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B |
|---|---|---|---|---|---|---|---|---|---|---|---|---|---|---|---|---|---|---|---|
| Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B |

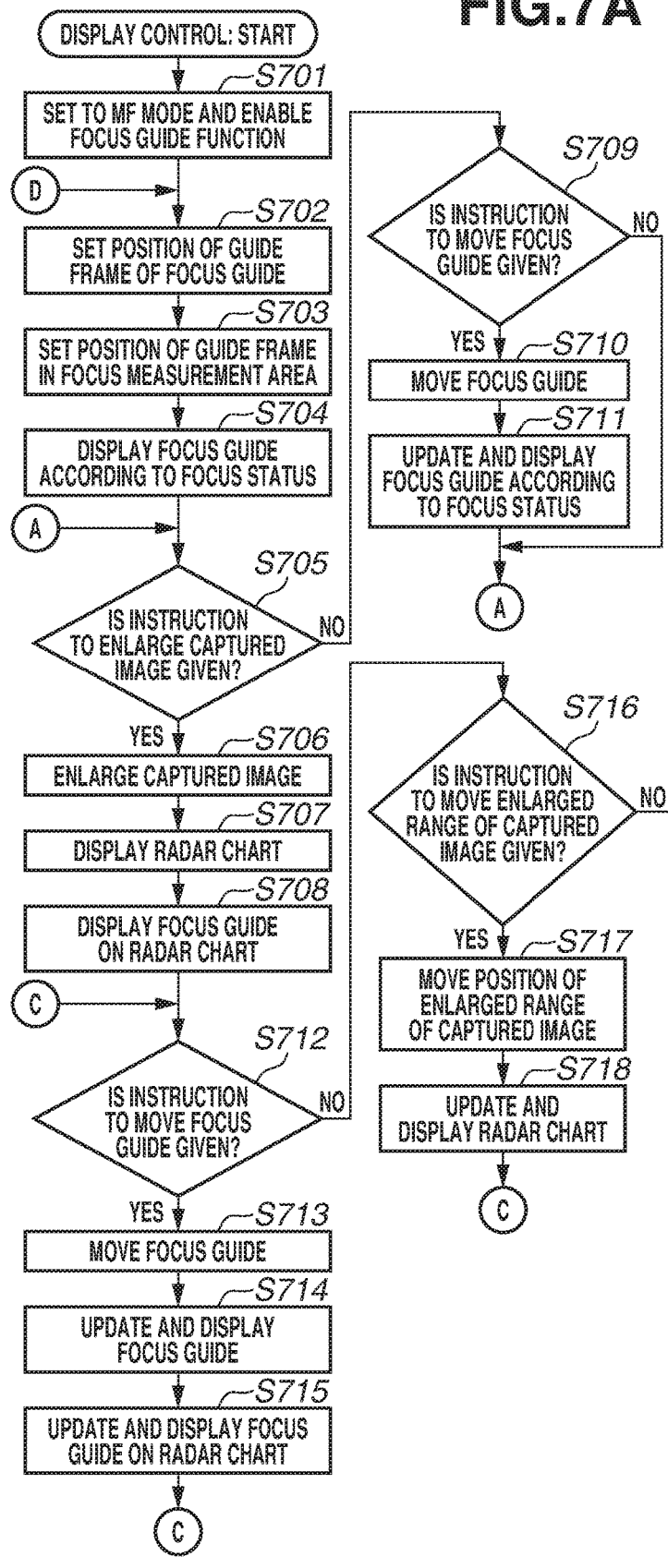
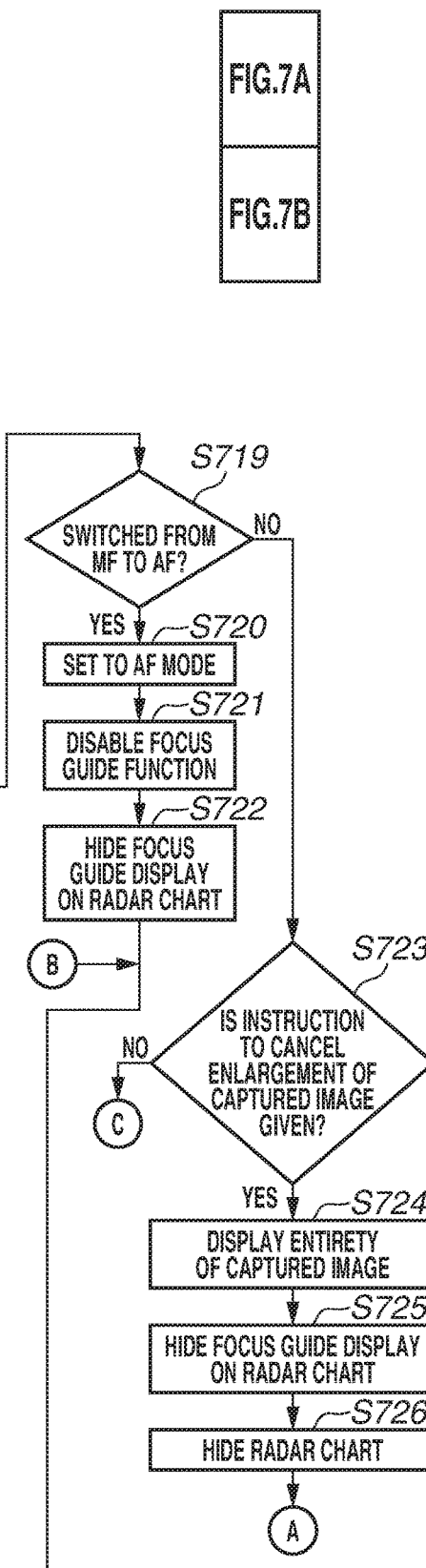
FIG. 7A
FIG. 7
| FIG. 7A |
| --- |
| FIG. 7B |

IMAGING CONTROL APPARATUS FOR CONTROLLING TO DISPLAY FOCUS INFORMATION AND CONTROL METHOD FOR CONTROLLING IMAGING CONTROL APPARATUS

BACKGROUND OF THE INVENTION

Field of the Invention

The aspect of the embodiments relates to an imaging control apparatus and a control method for controlling an imaging control apparatus.

Description of the Related Art

In an imaging apparatus such as a video camera, a technique for facilitating focusing is discussed. Japanese Patent Application Laid-Open No. 2016-197180 discusses a display control apparatus configured to display a guide regarding the amount of focus in a specified area. Further, Japanese Patent Application Laid-Open No. 2016-197182 discusses a display control apparatus for, when the guide regarding the amount of focus is displayed in a state where a captured image in the specified area is enlarged and displayed, displaying the guide in a suitable display form.

The above patent literature, however, has a situation that when the captured image is enlarged and displayed, if an enlarged display area and the position of a guide display regarding the amount of focus are different from each other, it is difficult for a user to figure out a position for which the guide regarding the amount of focus is displayed.

SUMMARY OF THE INVENTION

An apparatus includes a memory and at least one processor to perform the operations of the following units: an acquisition unit configured to acquire information regarding a focus detection position in an image captured by an image capturing unit, a display control unit configured to perform control to enlarge and display a part of the image on a display unit, and a control unit configured to perform control to, in a case where the part of the image is enlarged and displayed, display an enlargement guide indicating a position of the enlargement relative to an entire image, wherein the control unit performs control to, in a case where the focus detection position is outside of a range of the enlarged display part of the image, produce on the enlargement guide a display indicating a location of the focus detection position.

Further features of the disclosure will become apparent from the following description of exemplary embodiments with reference to the attached drawings.

BRIEF DESCRIPTION OF THE DRAWINGS

FIG. 1 is a diagram illustrating an example of a hardware configuration of a camera.

FIGS. 2A and 2B are diagrams illustrating an example of a configuration of a part of a light-receiving surface of an image sensor.

DESCRIPTION OF THE EMBODIMENTS

Figure 3A:
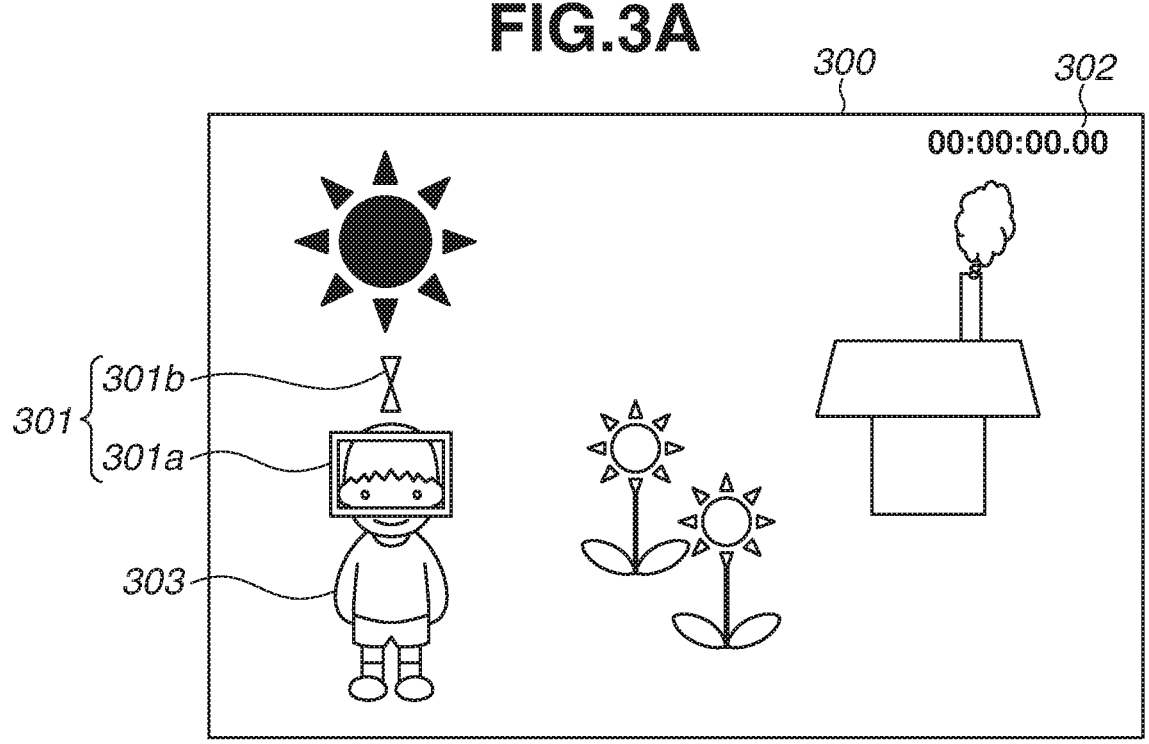
FIGS. 3A to 3E are diagrams illustrating an example of a display screen produced on a display unit.

An exemplary embodiment of the disclosure will be described in detail below with reference to the accompanying drawings. It is to be noted that the following exemplary embodiment is merely one example for implementing the disclosure and can be appropriately modified or changed depending on individual constructions and various conditions of apparatuses to which the disclosure is applied. Thus, the disclosure is in no way limited to the following exemplary embodiment.

A first exemplary embodiment is described below. In the present exemplary embodiment, a case is described where an imaging control apparatus is a digital camera 10 (hereinafter referred to as the "camera 10").

<Hardware Configuration>

FIG. 1 is a diagram illustrating an example of the hardware configuration of the camera 10.

A housing 100 is an exterior containing many of the components of the camera 10. Various operation units, a display unit 101, and an external output unit 102 are exposed to the surface of the housing 100.

An interchangeable lens 103 is an imaging lens composed of a plurality of lens groups. The interchangeable lens 103 includes a focus lens, a zoom lens, and a shift lens therewithin and also includes a diaphragm.

An image sensor 104 has a configuration in which a plurality of pixels, each including a photoelectric conversion element, is arranged two-dimensionally. The image sensor 104 photoelectrically converts in each pixel an optical image of an object formed by the interchangeable lens 103, performs analog-to-digital (A/D) conversion on the resulting signal using an A/D conversion circuit, and outputs image signals (raw image data) in pixel units. The details of the image sensor 104 used in the present exemplary embodiment and a distance measurement unit 105, which is related to the image sensor 104, will be described below with reference to FIGS. 2A and 2B.

A neutral density (ND) filter 106 is provided in the camera 10 to adjust the amount of incident light independently of the diaphragm included in the lens 103.

An image processing unit 107 corrects the difference in level caused by the image sensor 104. For example, using a pixel in an optical black (OB) area, the image processing unit 107 corrects the level of a pixel in an effective area and corrects a defective pixel using surrounding pixels. Further, the image processing unit 107 performs a peripheral illumination fall-off correction process, a color correction process, a contour emphasis process, a noise removal process, a gamma correction process, a debayer process, and a compression process. The image processing unit 107 performs the above processes on raw image data input from the image sensor 104 and outputs the corrected image data to another control unit.

A recording medium interface (I/F) unit 108 is an interface between a recording medium 109 and the camera 10 and controls the recording of image data input from the image processing unit 107 to the recording medium 109 or the reading of recorded image data from the recording medium 109.

The recording medium 109 is a recording medium composed of a semiconductor memory for recording captured image data. According to the control of the recording medium I/F unit 108, the recording medium 109 records image data or reads recorded image data. The recording medium 109 is an attachable and detachable memory card. Alternatively, the recording medium 109 may be built into the camera 10.

A graphics processing unit (GPU) 110 is a rendering engine for drawing various display information of the camera 10 and a menu screen in a video random-access memory (VRAM). The GPU 110 has a drawing function for drawing a character string and a figure, and in addition, an enlargement/reduction drawing function, a rotation drawing function, and a layer combining function. The VRAM includes an alpha channel representing transparency and can display a display object drawn in the VRAM as an on-screen display (OSD) on a captured image or a reproduction image, using a display I/F unit 111.

The display I/F unit 111 performs a superimposition process and a resizing process on image data (a captured image or a reproduction image) from the image processing unit 107 and a display object drawn on the VRAM by the GPU 110 and outputs the resulting data to (displays the resulting data on) the display unit 101. In an enlarged display mode, the display I/F unit 111 performs the superimposition process and the resizing process on a partial area of image data. As a result, in the enlarged display mode, a more enlarged image is displayed on the display unit 101 as compared with a normal state. Thus, it is easy for a user to perform a focus adjustment operation more accurately in manual focus (MF).

The display unit 101 is a display unit in a viewfinder or an external monitor that displays image data output from the display I/F unit 111 to confirm the angle of view. The angle of view can be visually confirmed from the housing 100 side. The display unit 101 is composed of a liquid crystal display or an organic electroluminescent (EL) display (an organic light-emitting diode display).

A main body microcomputer 112 is a control unit for controlling the operation of the entire camera 10 and is composed of a microcomputer. The main body microcomputer 112 includes a central processing unit (CPU) 112a, a read-only memory (ROM) 112b, and a random-access memory (RAM) 112c. The CPU 112a loads a program stored in the ROM 112b into the RAM 112c and executes the program, thereby achieving the operation of a flowchart described below.

Each of a gain control unit 113, a shutter control unit 114, an ND control unit 115, and a diaphragm control unit 116 is a control unit regarding exposure control. These units are controlled by the main body microcomputer 112 based on the result of the main body microcomputer 112 calculating the luminance level of image data output from the image processing unit 107, or based on an operation parameter manually set by the user.

The gain control unit 113 controls the gain of the image sensor 104.

The shutter control unit 114 controls the shutter speed of the image sensor 104.

The ND control unit 115 controls the amount of light incident on the image sensor 104 through the ND filter 106.

The diaphragm control unit 116 controls the diaphragm of the interchangeable lens 103.

A focus control unit 117 performs an operation that differs depending on whether a focus driving state (an operation mode) stored in the main body microcomputer 112 is an MF mode or an autofocus (AF) mode.

In the case of the AF mode, with reference to image data output from the image processing unit 107, the main body microcomputer 112 calculates in-focus information. Then, based on the in-focus information, the focus control unit 117 controls the focus lens within the interchangeable lens 103. Alternatively, based on the amount of defocus output from the distance measurement unit 105 as a result of imaging plane phase difference detection, the focus control unit 117 controls the focus lens within the interchangeable lens 103. The in-focus information can also be calculated based only on an object in an AF frame set in a partial area of the image data.

Further, the AF mode includes two modes depending on the behavior of the main body microcomputer 112. One is a one-shot AF mode, which is the mode of performing AF control only when a one-shot AF key 129 is pressed and stopping the control of the focus control unit 117 after success or failure of focusing is established. The other is a continuous AF mode (servo AF), which is the mode of performing AF control. Even in the continuous AF mode, however, when the camera 10 is placed in an AF lock state by pressing an AF lock key 130, the control of the focus control unit 117 is stopped. The two modes are switched by changing a setting in the menu screen.

In the MF mode, the focus control unit 117 stops AF control. In this case, the user can perform focus adjustment at their discretion by rotating a focus ring 134 incorporated into the interchangeable lens 103.

An image stabilization control unit 118 performs an optical image stabilization process for controlling the shift lens within the interchangeable lens 103 to cancel out camera shake, based on the motion vector of an object calculated by the main body microcomputer 112 with reference to image data output from the image processing unit 107. Alternatively, the image stabilization control unit 118 performs an electronic image stabilization process that clips an image in each frame of a moving image in the direction in which image blurring caused by camera shake is cancelled out.

A memory I/F unit 119 writes, to a memory 120, raw image data for all the pixels output from the image sensor 104. Further, the memory I/F unit 119 reads raw image data stored in the memory 120 and outputs the read raw image data to the image processing unit 107.

The memory 120 is a volatile storage medium for saving raw image data for all the pixels of several frames. The image processing unit 107 performs image processing for control on raw image data of all the pixels transmitted from the memory I/F unit 119.

An external output I/F unit 121 performs a resizing process on image data received from the image processing unit 107. Further, the external output I/F unit 121 performs conversion of a signal and applies a control signal in a manner suitable for specification of the external output unit 102. Then, the external output I/F unit 121 outputs the resulting data to the external output unit 102.

The external output unit 102 is a terminal for outputting image data to the outside of the camera 10 and is, for example, a serial digital interface (SDI) terminal or a High-Definition Multimedia Interface (HDMI) (registered trademark) terminal. A monitor display, which is an external device, or an external recording device can connect with the external output unit 102.

An external operation I/F unit 122 is an interface for receiving a control instruction from an external operation unit 123 and notifying the main body microcomputer 112 of the received control instruction. For example, the external operation I/F unit 122 corresponds to an infrared remote controller light-receiving unit, a wireless local area network (LAN) interface, or a Local Application Control Bus System (LANC) (registered trademark).

The external operation unit 123 transmits the control instruction (control command) to the external operation I/F unit 122. The external operation unit 123 can transmit an instruction corresponding to an operation in each of operation units (a menu key 124 to an AF/MF switch 135) incorporated into the housing 100 or the interchangeable lens 103. Further, the external operation unit 123 can transmit setting change information input through the menu screen displayed on the display unit 101.

The menu key 124 to the AF/MF switch 135 are operation units and includes components such as a key (a button), a dial, a tactile switch, a ring, and a touch panel. Each operation unit functions to receive an operation of the user and notify the main body microcomputer 112 of the control instruction. The menu key 124 to a start/stop key 133 are operation units provided on a main body side in the housing 100. The focus ring 134 and the AF/MF switch 135 are lens side operation units provided in the interchangeable lens 103. By making a setting in the menu screen, the functions of the keys of some of these operation units can also be changed, or some of these operation units can also be assigned to other functions.

The menu key 124 is used to give an instruction to display the menu screen on the display unit 101, or give an instruction to close the already opened menu screen.

A crisscross key 125 and a dial 126 are used to give an instruction to move a cursor for selecting an item in the menu screen, or give an instruction to move a displayed frame regarding the focus in a direction desired by the user. The crisscross key 125 is a direction key composed of an up key, a down key, a left key, and a right key, which may be separate operation members, or may be configured as the same operation member to give an instruction as to up, down, left, and right directions according to the pressed position. The dial 126 is a rotary operation member on which a clockwise operation and a counterclockwise operation can be performed.

A set key 127 is used to give an instruction to select an item at which the cursor is placed in the menu screen, or give an instruction to finalize various setting operations.

A cancel key 128 is used to give an instruction to, when a low level layer in a hierarchy is selected in the menu screen, return to one level higher layer in the hierarchy, or give an instruction to cancel various setting operations.

The one-shot AF key 129 is used to, when the AF mode is the one-shot AF mode, give an instruction to drive AF by the focus control unit 117.

The AF lock key 130 is used to, when the AF mode is the continuous AF mode, give a stop instruction to stop the control of the focus control unit 117, or give a cancellation instruction to cancel a control stopped state.

An enlarge key 131 is used to give an instruction to enlarge an image displayed on the display unit 101, or give an instruction to return the image back to the previous state.

A display key 132 is used to give an instruction to change a Disp level held in the main body microcomputer 112. Based on a selected Disp level, various information displays to be produced on the display unit 101 are limited so that more detailed information can be displayed, or an image can be more clearly displayed.

The start/stop key 133 is used to give an instruction to start or stop recording to be performed through the recording medium I/F unit 108.

When the focus driving state is the MF mode, the focus ring 134 can move the focus lens within the interchangeable lens 103 and perform focus adjustment.

The AF/MF switch 135 is used to give an instruction to switch between focus driving states, i.e., between the AF mode and the MF mode.

A first shutter switch 137 is turned on in an intermediate state of an operation, i.e., by a so-called half press (an image capturing preparation instruction) of a shutter button 136 provided in the camera 10 and generates a first shutter switch signal SW1. Based on the first shutter switch signal SW1, the operation of an AF process, an automatic exposure (AE) process, an automatic white balance (AWB) process, or a pre-flash (EF) process is started.

A second shutter switch 138 is turned on by the completion of an operation, i.e., a so-called full press (an image capturing instruction) of the shutter button 136 and generates a second shutter switch signal SW2. Based on the second shutter switch signal SW2, the main body microcomputer 112 starts a series of operations of an image capturing process from reading of a signal from the image sensor 104 to writing of image data to the recording medium 109.

<Imaging Plane Phase Difference Detection>

FIGS. 2A and 2B are diagrams illustrating a part of a light-receiving surface of the image sensor 104 as an image sensor.

In the image sensor 104, in order to enable imaging plane phase difference AF, pixel portions, each holding two photodiodes that are light-receiving units as photoelectric conversion units for a single microlens, are arranged in an array. Consequently, each pixel portion can receive a light beam obtained by dividing the exit pupil of the interchangeable lens 103.

FIG. 2A is a schematic diagram illustrating an example of a part of the surface of an image sensor in an example of the Bayer arrangement based on red (R), blue (B), and green (Gb, Gr), for reference. FIG. 2B is a schematic diagram illustrating examples of pixel portions, each holding two photodiodes as photoelectric conversion units for a single microlens, corresponding to the arrangement of a color filter in FIG. 2A.

An image sensor having such a configuration can output two signals for phase difference detection (hereinafter also referred to as an "A-image signal" and a "B-image signal") from each pixel portion. Further, the image sensor can output a signal for recording a captured image (the A-image signal+the B-image signal) obtained by adding signals of the two photodiodes together. As for the added signal, a signal equivalent to the output of the image sensor in the example of the Bayer arrangement outlined in FIG. 2A is output.

Using such output signals from the image sensor 104, the distance measurement unit 105 performs a correlation calculation between the two image signals and makes a calculation to obtain information regarding the amount of defocus and various reliabilities. Based on the shift between the A-image signal and the B-image signal, the distance measurement unit 105 calculates the amount of defocus at an image plane. The amount of defocus has a positive or negative value. Based on whether the amount of defocus shows a positive value or a negative value, it can be determined whether the camera 10 is in a front focus state or a back focus state. Further, based on the absolute value of the amount of defocus, the degree of focusing from an in-focus state can be found. If the amount of defocus is 0, the camera 10 is in focus. That is, based on the positivity and negativity of the amount of defocus calculated regarding a distance measurement position (a focus detection position), the distance measurement unit 105 outputs, to the CPU 112*a*, information regarding whether the camera 10 is in the front focus state or the back focus state. Further, based on the absolute value of the amount of defocus, the distance measurement unit 105 outputs degree-of-focusing information (the degree of out-of-focus) to the CPU 112*a*. In a case where the amount of defocus exceeds a predetermined value, the distance measurement unit 105 outputs information regarding whether the camera 10 is in the front focus state or the back focus state. In a case where the absolute value of the amount of defocus is less than or equal to the predetermined value, the distance measurement unit 105 outputs information indicating that the camera 10 is in the in-focus state. The degree-of-focusing information is output as an amount of defocus converted into an amount of an operation of rotating the focus ring 134 that is required to bring the camera 10 into focus.

In the present exemplary embodiment, the image sensor 104 outputs a total of three signals, namely a signal for imaging and two signals for phase difference detection. The aspect of the embodiments, however, is not limited to such a method. Alternatively, for example, the image sensor 104 may output a total of two signals, namely a signal for imaging and one of two signals for phase difference detection. In this case, after the outputting, the other of the two image signals for phase difference detection is calculated using the two output signals from the image sensor 104.

Further, in FIGS. 2A and 2B, an example is illustrated where pixel portions, each holding two photodiodes as photoelectric conversion units for a single microlens, are arranged in an array. The aspect of the embodiments, however, is not limited to this case. Alternatively, for example, pixel portions, each holding three or more photodiodes as photoelectric conversion units for a single microlens, may be arranged in an array. Yet alternatively, a plurality of pixel portions in which light-receiving units have different opening positions for a microlens may be included. More particularly, the two signals for phase difference detection that enable phase difference detection, such as the A-image signal and the B-image signal, are acquired as a result of the process.

<Examples of Screens for Focus Guide Function and Enlarged Image Display Function>

The camera 10 according to the present exemplary embodiment has a focus guide function and an enlarged image display function as focus assist functions.

The focus guide function is the mode of indicating the focus status with an indicator in an area specified by the user. The user can visually confirm using an indicator whether the camera 10 is in the in-focus state (the state where an object at the focus detection position is in focus) or is in the front focus state or the back focus state. The enlarged image display function is the function of displaying a captured image (a live view image) in an area specified by the user at any magnification. The user can visually confirm the enlarged captured image and thereby can confirm the captured image in more detail.

First, with reference to FIGS. 3A to 3E, a description is given of display examples of screens when the focus guide function is executed.

FIG. 3A is a diagram illustrating an example of a display screen 300 produced on the display unit 101.

On the display screen 300, a focus guide 301, a recording time 302, and an object 303 are displayed. The focus guide 301 is an example of a recognition item. The focus guide 301 and the recording time 302 are displayed as an OSD on a captured image in a superimposed manner. These OSDs are contents drawn in a VRAM for OSDs by the GPU 110 in response to an instruction from the CPU 112*a*. The object 303 is a part of image data as a captured image from the image processing unit 107. As described above, the GPU 110 combines the VRAM for OSDs and the image data, whereby it is possible to produce the display screen 300 illustrated in FIG. 3A on the display unit 101.

The focus guide 301 includes a guide frame 301*a* and an indicator 301*b*. The guide frame 301*a* is a display indicating the focus detection position, and the display form of the guide frame 301*a* changes according to the degree of focusing as the focus status. The guide frame 301*a* is an example of a first recognition item. Further, the indicator 301*b* indicates the degree of focusing, and the display form of the indicator 301*b* changes according to the degree of focusing. The indicator 301*b* is an example of a second recognition item.

With reference to FIGS. 3B to 3E, the changes in the display form of the focus guide 301 are described.

Figure 3B:
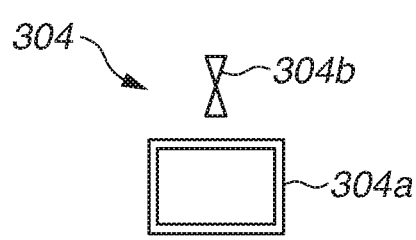

A focus guide 304 illustrated in FIG. 3B indicates the in-focus state (the state where an object at the focus detection position is in focus). A guide frame 304*a* has a frame shape formed of a loop with no breaks, and the frame itself has, for example, a green color (a first color). The shape and the color of the guide frame 304*a* indicate that the camera 10 is in the in-focus state.

An indicator 304*b* is located above the guide frame 304*a* and represented by two triangles which are arranged symmetrically in the vertical direction and of which the apexes coincide with each other. The indicator 304*b* has the same color as the guide frame 304*a*. The shape and the color of the indicator 304*b* indicate that the camera 10 is in the in-focus state.

Figure 3C:
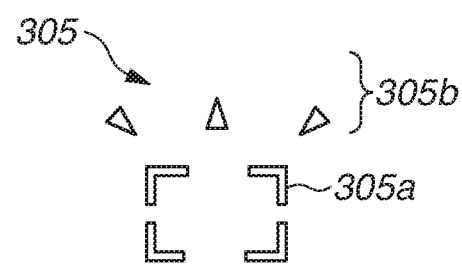

A focus guide 305 illustrated in FIG. 3C indicates the back focus state (the state where a position behind an object at the focus detection position is in focus). A guide frame 305*a* has a frame shape formed of a loop with partial breaks, specifically, a shape formed of square brackets located at four corners, and the frame itself has, for example, a white color (a second color). The shape and the color of the guide frame 305*a* indicate that the camera 10 is not in the in-focus state.

An indicator 305*b* is represented by three triangles located above the guide frame 305*a*. The central triangle indicates the target point for moving the left and right triangles toward the in-focus state, and the apex of the central triangle is located above. The left and right triangles indicate the degree of focusing, i.e., the amount of shift from the in-focus state at the focus detection position, by the distance (or the angle) between the left and right triangles, and the apex of the left and right triangles is located below. The distance (or the angle) between the left and right triangles is smaller or narrower (the angle is smaller) in a case where the amount of shift from the in-focus state is smaller than in a case where the amount of shift from the in-focus state is great. If the distance between the object and the camera 10 fluctuates, the degree of focusing changes. Thus, the distance between the left and right triangles dynamically changes, i.e., the distance decreases or increases. Further, the indicator 305*b* has the same color as the guide frame 305*a*. The shape of the indicator 305*b* (the form in which the left and right triangles are separate from each other with their apexes located below) shows that the camera 10 is in the back focus state. The color of the indicator 305*b* shows that the camera 10 is not in the in-focus state.

Figure 3D:
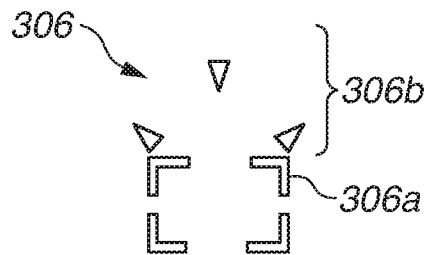

A focus guide 306 illustrated in FIG. 3D indicates the front focus state (the state where a position in front of an object at the focus detection position is in focus). A guide frame 306*a* has a frame shape formed of a loop with partial breaks, specifically, a shape formed of square brackets located at four corners, and the frame itself has, for example, the white color (the second color). The shape and the color of the guide frame 306*a* indicate that the camera 10 is not in the in-focus state.

An indicator 306*b* is represented by three triangles located above the guide frame 306*a*. The central triangle indicates the target point for moving the left and right triangles toward the in-focus state, and the apex of the central triangle is located below. The left and right triangles indicate the degree of focusing, i.e., the amount of shift from the in-focus state at the focus detection position, by the distance (or the angle) between the left and right triangles, and the apex of each of the left and right triangles is located above. Similarly to FIG. 3C, the distance (or the angle) between the left and right triangles is smaller or narrower (the angle is smaller) in a case where the amount of shift from the in-focus state is small than in a case where the amount of shift from the in-focus state is great. Further, the indicator 306*b* has the same color as the guide frame 306*a*. The shape of the indicator 306*b* (the form in which the left and right triangles with the apexes located above are separate from each other) indicates that the camera 10 is in the front focus state. The color of the indicator 306*b* shows that the camera 10 is not in the in-focus state.

Figure 3E:
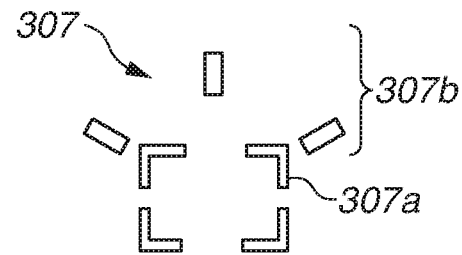

A focus guide 307 illustrated in FIG. 3E indicates the state where it cannot be determined whether the camera 10 is in the front focus state and the back focus state, i.e., the state where distance measurement has failed. A guide frame 307*a* has a frame shape formed of a loop with partial gaps, specifically, a shape formed of square brackets located at four corners, and the frame itself has, for example, a gray color (a third color), which is different from the green color and the white color. The color of the guide frame 307*a* indicates the state where distance measurement has failed. An indicator 307*b* is represented by three rectangles located above the guide frame 307*a*. Further, the indicator 307*b* has the same color as the guide frame 307*a*. The shape and the color of the indicator 307*b* indicate the state where distance measurement has failed.

As described above, the user can visually confirm the focus guide 301 (the focus guides 304 to 307) and thereby confirm the focus detection position and the focus status at the focus detection position. The display forms of the focus guides 304 to 307 illustrated in FIGS. 3B to 3E are merely examples, and may be other display forms so long as the user can confirm the focus detection position and the focus status at the focus detection position.

Figure 4A:
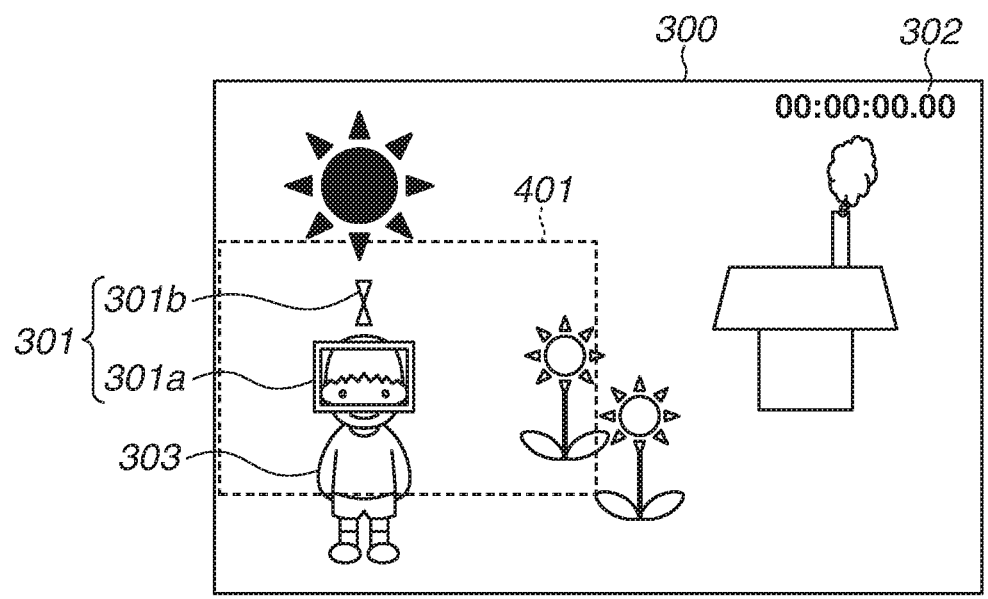
FIGS. 4A and 4B are diagrams illustrating examples of display screens when a captured image is enlarged.
Figure 4B:
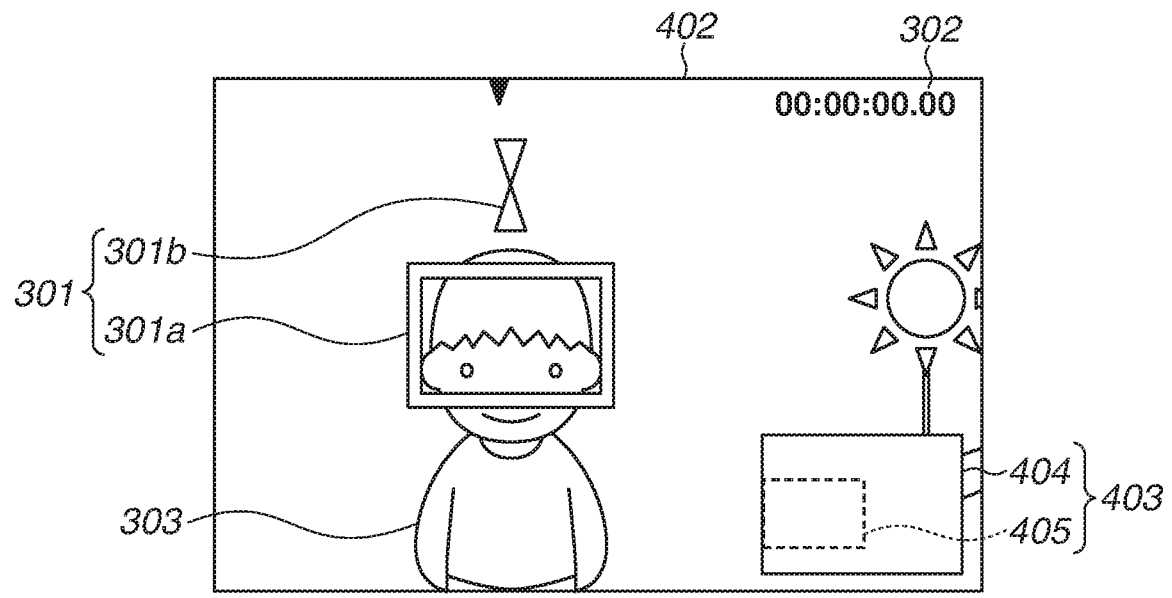

Next, with reference to FIGS. 4A and 4B, a description is given of display examples of screens when the enlarged image display function (the enlarged display mode) is executed.

FIG. 4A is a diagram illustrating an example of a display screen 300 produced on the display unit 101 before the enlarged image display function is executed. The display screen 300 illustrated in FIG. 4A is the same as the display screen 300 illustrated in FIG. 3A, and the same components as those in FIG. 3A are designated by the same signs. Further, an enlarged range 401 illustrated in FIG. 4A indicates a range to be enlarged using the enlarged image display function.

FIG. 4B is a diagram illustrating an example of a display screen 402 after the enlarged image display function is executed. In FIG. 4B, since a range including the focus guide 301 is enlarged, the focus guide 301 is also displayed on the display screen 402 by executing the enlarged image display function. At this time, a radar chart 403 is displayed in a part (e.g., at the lower right) of the display screen 402. The radar chart 403 indicates the position of the enlargement relative to the entire image. The radar chart 403 is an example of an enlargement guide.

The radar chart 403 includes an entire image display 404 displaying a range corresponding to the entirety of the image, and an enlarged range display 405 displaying the position of the enlarged range relative to the entire image. Thus, in a case where the enlarged image display function is executed, the user can figure out the position of the enlarged range relative to the entirety of the image by visually confirming the radar chart 403. The process of enlarging a part of the entirety of the image is performed by the image processing unit 107 or the GPU 110.

<Example of Display when Enlarged Range is Moved>

Figure 5A:
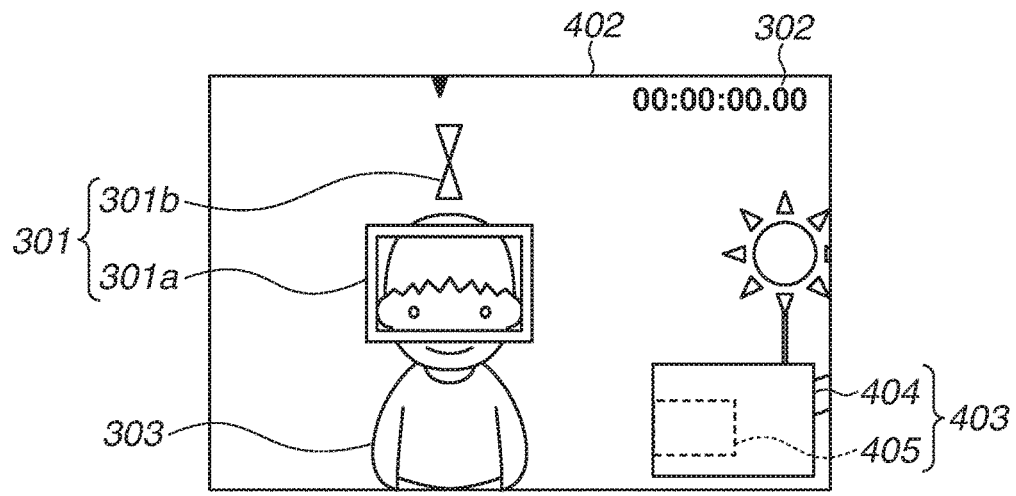
FIGS. 5A to 5C are diagrams illustrating examples of display screens when an enlarged range is moved.
Figure 5B:
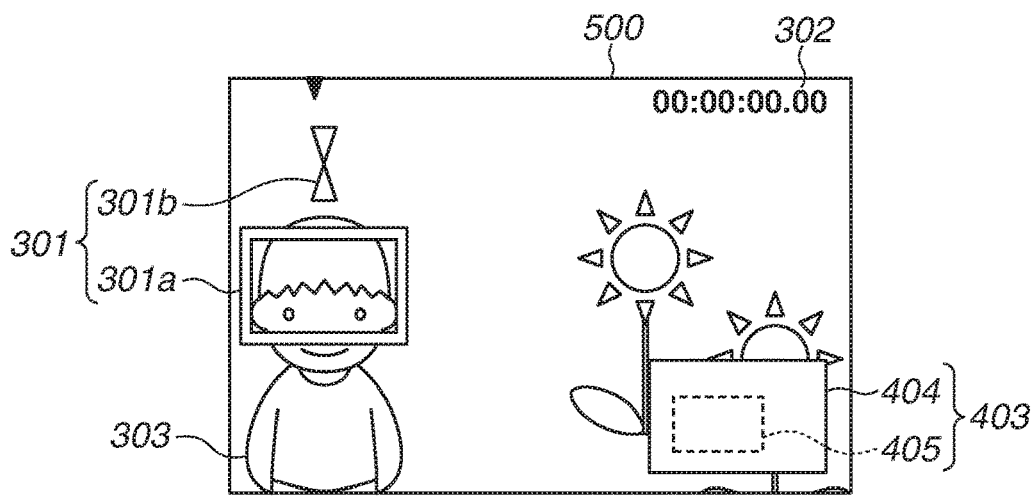
Figure 5C:
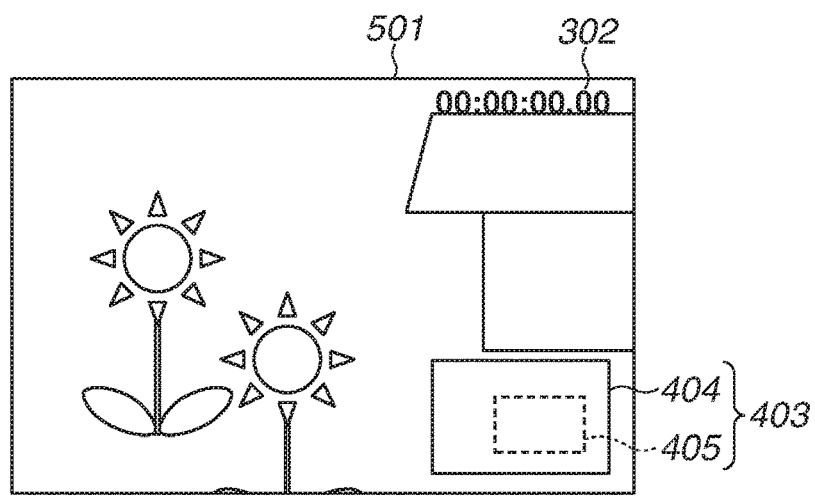

Next, with reference to FIGS. 5A to 5C, a description is given of display examples of screens when the enlarged range is moved in the state where the enlarged image display function is executed. In the present case, the user uses the crisscross key 125 as the operation of moving the enlarged range. Alternatively, the user may move the enlarged range by, for example, performing a touch operation on the touch panel.

FIG. 5A is a diagram illustrating an example of a display screen 402 displayed before the enlarged range is moved. The display screen 402 illustrated in FIG. 5A is the same as the display screen 402 illustrated in FIG. 4B, and the same components as those in FIG. 4B are designated by the same signs. In the state illustrated in FIG. 5A, the user can move the enlarged range relative to the entirety of the image by performing input using the crisscross key 125 (e.g., the right key), while maintaining the enlargement ratio.

FIG. 5B is a diagram illustrating an example of a display screen 500 after the enlarged range is moved. In FIG. 5B, along with the movement of the enlarged range to the right, also the enlarged range display 405 of the radar chart 403 is displayed changing its position to the right. On the display screen 500 in FIG. 5B, the focus guide 301 and the object 303 continue to be displayed. In the state illustrated in FIG. 5B, the user can further move the enlarged range by performing input using the crisscross key 125 (e.g., the right key).

FIG. 5C is a diagram illustrating an example of a display screen 501 after the enlarged range is further moved. In FIG. 5C, along with the further movement of the enlarged range to the right, the enlarged range display 405 of the radar chart 403 is displayed changing its position further to the right. In FIG. 5C, the focus guide 301 is not included in the moved enlarged range, and therefore, the focus guide 301 is not displayed on the display screen 501.

As described above, in a case where the focus guide 301 is not included in the moved enlarged range, it is difficult for the user to figure out the position of the focus guide 301.
<Example of Display when Focus Guide is Moved>

Figure 6A:
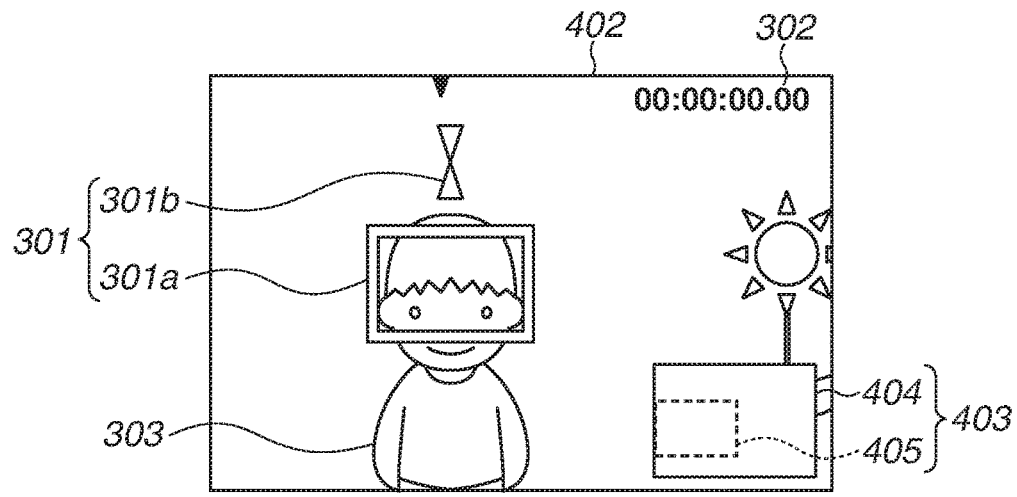
FIGS. 6A to 6C are diagrams illustrating examples of display screens when a focus guide is moved.
Figure 6B:
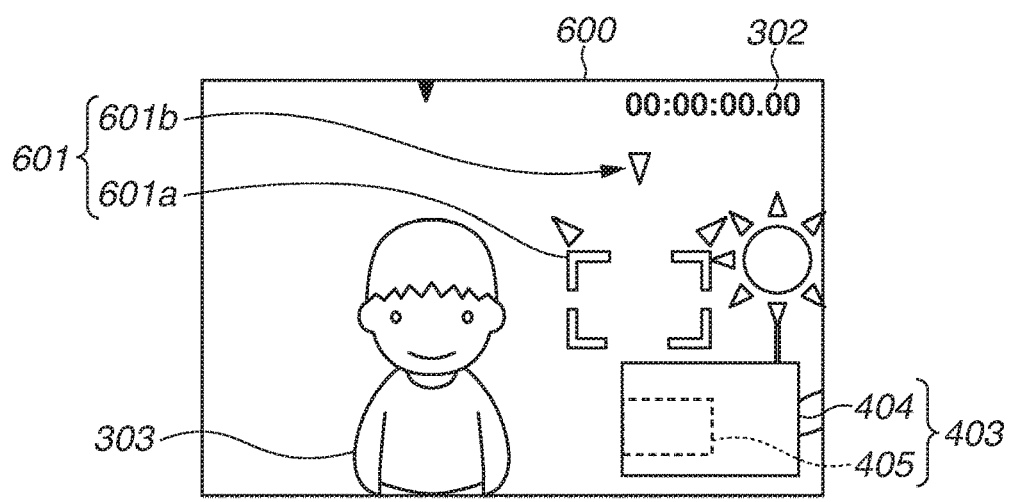
Figure 6C:
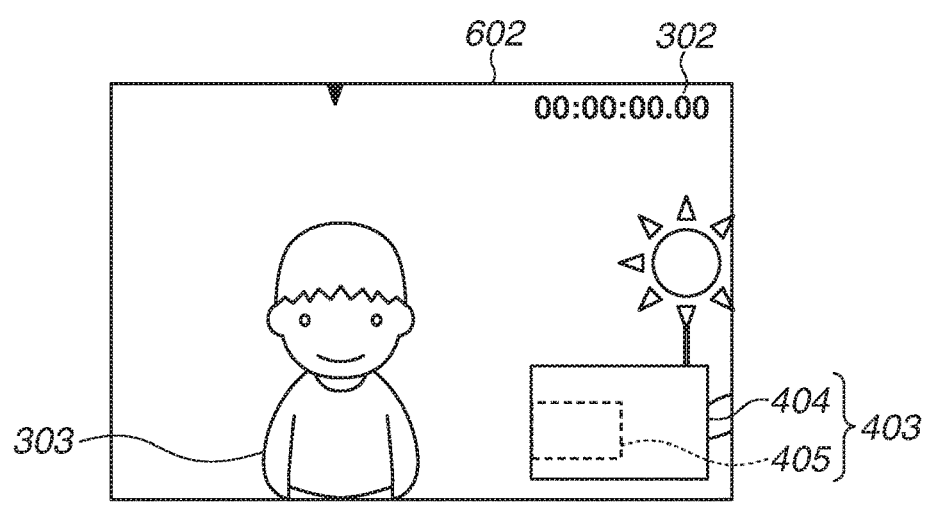

Next, with reference to FIGS. 6A to 6C, a description is given of display examples of screens when the focus guide is moved in the state where the enlarged image display function is executed. In the present case, the user uses the crisscross key 125 to carry out the operation of moving the focus guide. Alternatively, the user may move the focus guide by, for example, performing a touch operation on the touch panel.

FIG. 6A is a diagram illustrating an example of a display screen 402 displayed before the focus guide is moved. The display screen 402 illustrated in FIG. 6A is the same as the display screen 402 illustrated in FIG. 4B, and the same components as those in FIG. 4B are designated by the same signs. In the state illustrated in FIG. 6A, for example, the user can move the position of the focus guide 301 by performing input using the crisscross key 125 (e.g., the right key) while pressing the menu key 124.

FIG. 6B is a diagram illustrating an example of a display screen 600 after the focus guide 301 is moved. In FIG. 6B, along with the movement of the focus guide 301 to the right, the focus status changes, and therefore, the display forms of a guide frame 601a and an indicator 601b change. In this case, the guide frame 601a and the indicator 601b indicate that the camera 10 is in the front focus state. In the state illustrated in FIG. 6B, the user can further move the focus guide 301 by further performing input using the crisscross key 125 (e.g., the right key) while pressing the menu key 124.

FIG. 6C is a diagram illustrating an example of a display screen 602 after the focus guide 301 is further moved. In FIG. 6C, along with the further movement of the focus guide 301 to the right, the focus guide 301 comes to be not included in the enlarged range, and therefore, the focus guide 301 is not displayed on the display screen 602.

As described above, in a case where the focus guide 301 is not included in the enlarged range, it is difficult for the user to figure out the position of the focus guide 301.

In response, the camera 10 according to the present exemplary embodiment performs display control so that in a case where the enlarged range is moved or the focus guide 301 is moved, even if the focus guide 301 is not included in the enlarged range, the user can figure out the position of the focus guide 301.

Figure 7B:
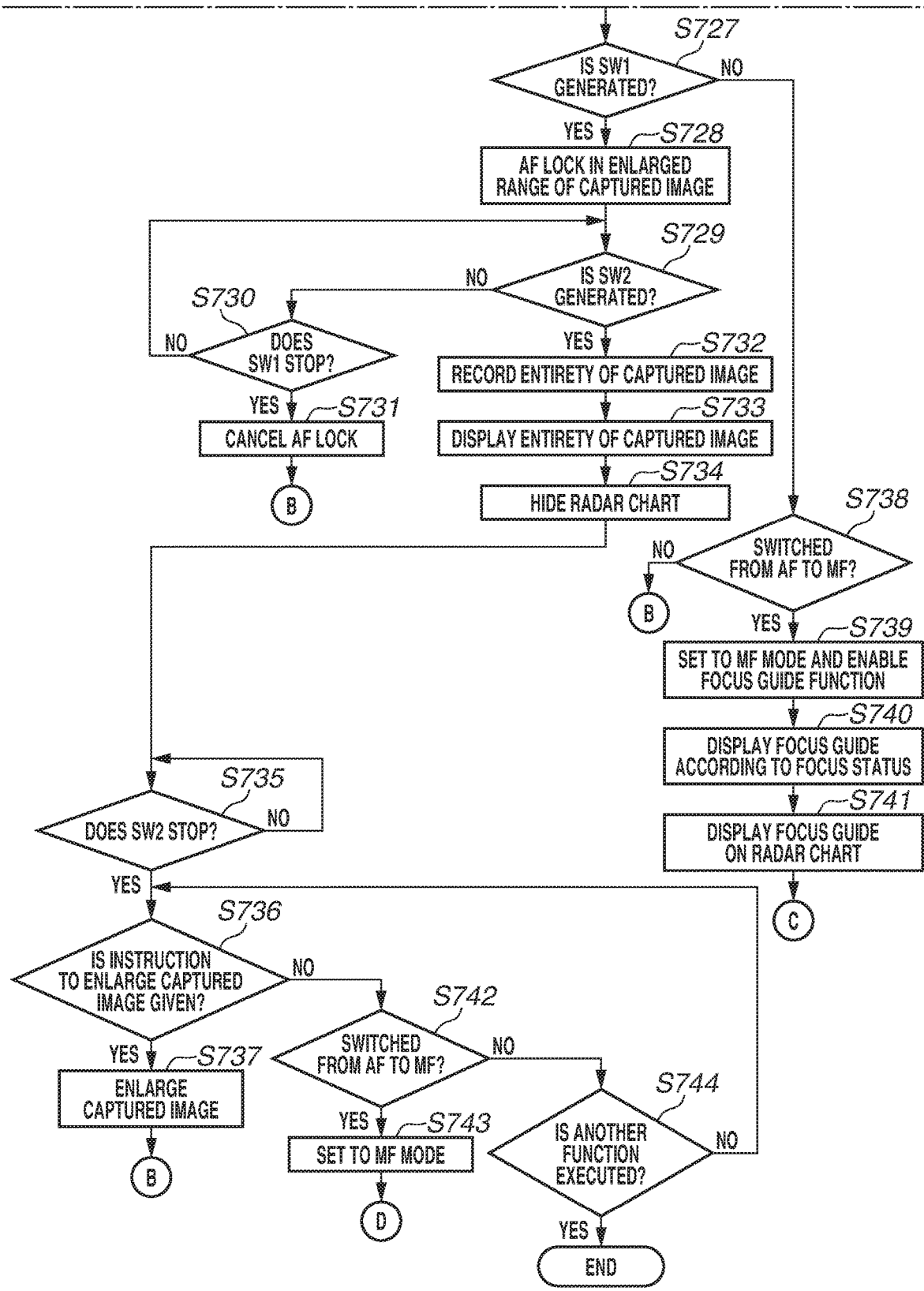
FIG. 7 including FIG. 7A and FIG. 7B which are flowcharts illustrating an example of processing of display control.

With reference to a flowchart in FIG. 7, the display control of the camera 10 according to the present exemplary embodiment is described. The flowchart in FIG. 7 is implemented by the CPU 112a reading a program from the ROM 112b, loading the program into the RAM 112c, and executing the program. Further, the flowchart in FIG. 7 is started by displaying a captured image on the display unit 101 and by the user switching the AF/MF switch 135 to MF.

In step S701, the CPU 112a sets the focus driving mode to the MF mode. This process corresponds to an example of a setting unit. Further, the CPU 112a enables the focus guide function.

In step S702, the CPU 112a sets the position of the guide frame of the focus guide at the center of the captured image. For example, the CPU 112 acquires information regarding the position where the guide frame is set, which is stored in advance in the ROM 112b, thereby setting the guide frame. This process corresponds to an example of an acquisition unit.

In step S703, the CPU 112a sets the position of the guide frame of the focus guide in a focus measurement area. Thus, the position of the guide frame is set at the focus detection position.

In step S704, the CPU 112a acquires the focus status in the focus measurement area. Specifically, based on the amount of defocus, the distance measurement unit 105 make a calculation to acquire information regarding whether the camera 10 is in any of the in-focus state, the front focus state, and the back focus state, and degree-of-focusing information and outputs the calculated information to the CPU 112a, whereby the CPU 112a acquires the focus status. Further, the CPU 112a displays the focus guide in a display form according to the focus status. Thus, any of the focus guide 304 in FIG. 3B to the focus guide 307 in FIG. 3E is displayed according to the focus status.

In step S705, the CPU 112a determines whether an instruction to enlarge the captured image is given by the user. For example, if the user operates the enlarge key 131, the CPU 112a determines that an instruction to enlarge the captured image is given. If an instruction to enlarge the captured image is given (Yes in step S705), the processing proceeds to step S706. If an instruction to enlarge the captured image is not given (No in step S705), the processing proceeds to step S709.

In step S706, the CPU 112a executes the enlarged image display function. Specifically, the CPU 112a performs control to display on the display unit 101 an enlarged image of the captured image generated by the GPU 110. This process corresponds to an example of processing by a display control unit.

Figure 8A:
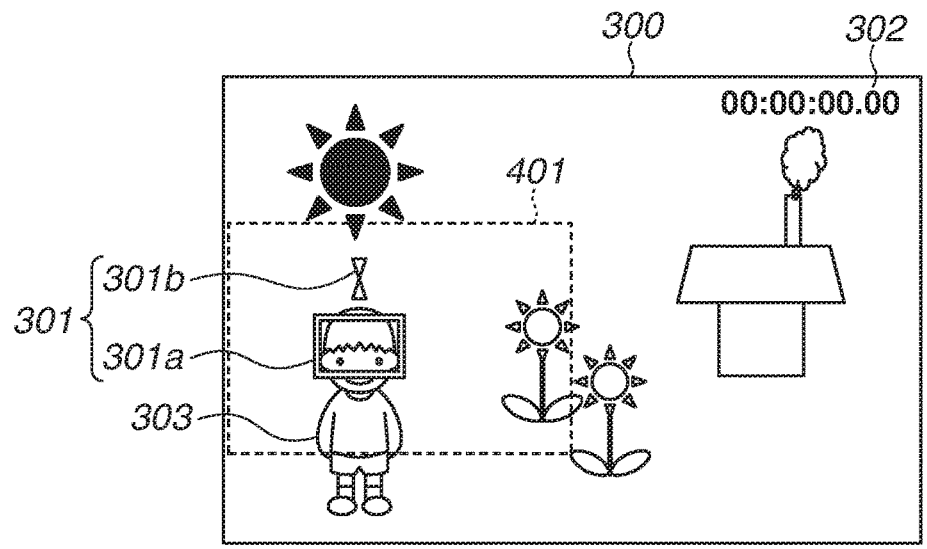
FIGS. 8A and 8B are diagrams illustrating examples of display screens when a captured image is enlarged.

FIG. 8A is a diagram illustrating an example of a display screen 300 displayed on the display unit 101 before the enlarged image display function is executed. The display screen 300 illustrated in FIG. 8A is the same as the display screen 300 illustrated in FIG. 4A, and the same components as those in FIG. 4A are designated by the same signs.

Figure 8B:
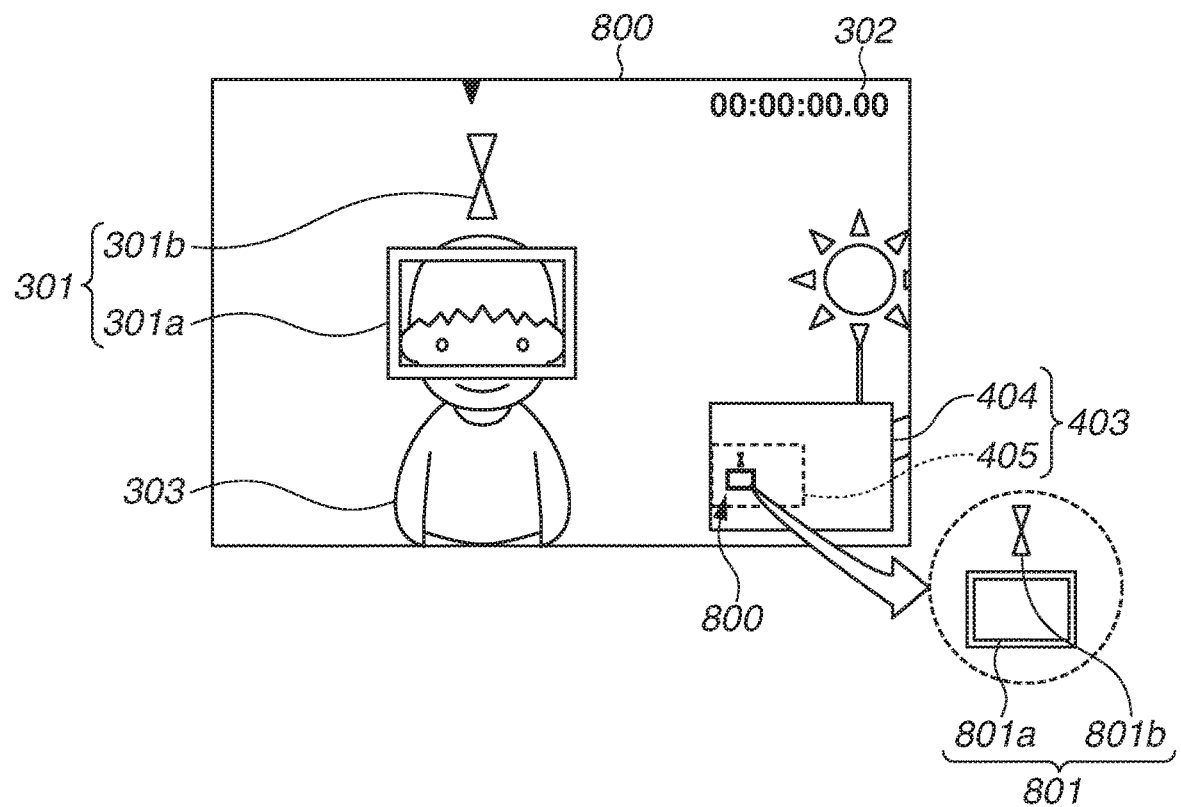

FIG. 8B is a diagram illustrating an example of a display screen 800 after the enlarged image display function is executed. In FIG. 8B, since a range including the focus guide 301 is enlarged, the focus guide 301 is also displayed on the display screen 800 by executing the enlarged image display function. In this case, an example is illustrated where the enlarged range 401 is set such that the focus guide 301 is located as close to the center as possible. However, in a case where information regarding the position of the previous enlarged range is stored in the RAM 112c, the CPU 112a may set the enlarged range at the same position as the stored position of the enlarged range. Alternatively, the CPU 112a may uniformly set the enlarged range at the center of the captured image.

In step S707, the CPU 112a displays a radar chart in a part of the captured image. This process is an example of processing by a control unit.

In FIG. 8B, a radar chart 403 is displayed in a part (e.g., at the lower right) of the display screen 800. The radar chart 403 indicates the position of the enlarged range relative to the entirety of the image. The radar chart 403 includes an entire image display 404 displaying a range corresponding to the entirety of the image, and an enlarged range display 405 displaying the position of the enlarged range relative to the entirety of the image.

The CPU 112a displays the radar chart 403 such that the ratio of the size of the enlarged range 401 to the size of the entire captured image is the same as the ratio of the enlarged range display 405 to the entire image display 404. Further, the CPU 112a displays the radar chart 403 such that the position of the enlarged range 401 relative to the entirety of the image is the same as the position of the enlarged range display 405 relative to the entire image display 404. Thus, the user can figure out the position and the size of the enlargement relative to the entire image by visually confirming the radar chart 403.

In step S708, the CPU 112a displays a focus guide display on the radar chart in a superimposed manner. This process is an example of processing by the control unit. The focus guide display is an example of a display indicating the location of the focus guide.

In FIG. 8B, a focus guide display 801 is displayed on the radar chart 403 in a superimposed manner. The focus guide display 801 includes a guide frame display 801a and an indicator display 801b (see an enlarged view indicated in a dashed circle). The guide frame display 801a is an example of a display indicating the location of the guide frame 301a. The guide frame display 801a is an example of a first display item. On the other hand, the indicator display 801b is an example of a display indicating the degree of focusing in the guide frame 301a. The indicator display 801b is an example of a second display item.

First, the CPU 112a displays the focus guide display 801 such that the position of the focus guide 301 relative to the entire image is the same as the position of the focus guide display 801 relative to the entire image display 404. Further, the CPU 112a displays the focus guide display 801 and the focus guide 301 so that the user can recognize that the focus guide display 801 and the focus guide 301 correspond to each other. Specifically, the CPU 112a displays the focus guide display 801 in the same display form as that of the focus guide 301. In this case, the CPU 112a displays the guide frame display 801a in the same shape and color as those of the guide frame 301a and displays the indicator display 801b in the same shape and color as those of the indicator 301b. Thus, in FIG. 8B, the guide frame display 801a is displayed in a loop-shaped frame and in the green color (the first color). The indicator display 801b is displayed as two triangles which are arranged symmetrically in the vertical direction and of which the apexes coincide with each other, and in the green color (the first color). The CPU 112a may display the guide frame display 801a such that at least either one of the shape and the color same as the guide frame 301a is adopted for the guide frame display 801a, and may display the indicator display 801b such that at least either one of the shape and the color same as the indicator 301b is adopted for the indicator display 801b.

Further, the CPU 112a displays the focus guide display 801 such that the ratio of the size of the focus guide 301 to the size of the entire image is the same as the ratio of the size of the focus guide display 801 to the size of the entire image display 404. Thus, in FIG. 8B, the guide frame display 801a is displayed to be smaller than the guide frame 301a, and the indicator display 801b is displayed to be smaller than the indicator 301b.

As described above, the focus guide display 801 is displayed on the radar chart 403, whereby the user can figure out the position of the focus guide 301 and the focus status by visually confirming the radar chart 403.

If the focus guide display 801 is merely displayed to be smaller than the focus guide 301, the focus guide display 801 could be too small, and it could be difficult for the user to visually confirm the focus guide display 801. Thus, the focus guide display 801 may be displayed more simply than the display form of the focus guide 301 so that the user can easily make a visual confirmation of the focus guide display 801. As examples of the simple display, only the guide frame display 801a is displayed while the indicator display 801b is hidden, or the guide frame display 801a is displayed without changing the shape, regardless of whether or not the guide frame 301a is in the in-focus state. In a case where only the guide frame display 801a is displayed, and the guide frame display 801a is maintained in the same shape regardless of whether or not the guide frame 301a is in the in-focus state, it is not possible to figure out the focus status of the guide frame 301a based only on the guide frame display 801a. Thus, in this case, the CPU 112a may display the guide frame display 801a by changing the color of the guide frame display 801a according to the focus status of the guide frame 301a. At this time, if the focus detection position is in the in-focus state, the CPU 112a may display the guide frame display 801a in the green color (the first color). In a case where the focus detection position is not in the in-focus state, the CPU 112a may display the guide frame display 801a in the white color (the second color). In the state where distance measurement has failed, the CPU 112a may display the guide frame display 801a in the gray color (the third color).

As described above, the focus guide display 801 is displayed simply on the radar chart 403, whereby the user can easily make a visual confirmation of display in the radar chart 403.

Meanwhile, in step S709, the CPU 112a determines whether an instruction to move the focus guide is given by the user. For example, if the user operates the crisscross key 125 while pressing the menu key 124, the CPU 112a determines that an instruction to move the focus guide is given. If an instruction to move the focus guide is given (Yes in step S709), the processing proceeds to step S710. If an instruction to move the focus guide is not given (No in step S709), the processing returns to step S705.

In step S710, the CPU 112a performs control to move the focus guide according to the instruction to move the focus guide. For example, if the user operates the crisscross key 125 while pressing the menu key 124, the CPU 112a moves the position of the focus guide 310 in a direction corresponding to the operation on the crisscross key 125. Further, the CPU 112a acquires the changed position of the guide frame of the focus guide and, in addition, updates the position of the guide frame as the focus measurement area.

In step S711, the CPU 112a performs control to update the focus guide based on the moved position of the focus guide and display the updated focus guide. Specifically, the CPU 112a acquires the focus status in the updated focus measurement area, updates the focus guide 301 to a display form according to the focus status, and displays the updated focus guide 301. This process is similar to the process of step S704. Then, the processing returns to step S705.

While, in step S712, the CPU 112a determines whether an instruction to move the focus guide is given by the user. This process is similar to the process of step S709. If an instruction to move the focus guide is given (Yes in step S712), the processing proceeds to step S713. If an instruction to move the focus guide is not given (No in step S712), the processing proceeds to step S716.

In step S713, the CPU 112a performs control to move the focus guide according to the instruction to move the focus guide. This process is similar to the process of step S710.

In step S714, the CPU 112a performs control to update the focus guide based on the moved position of the focus guide and display the updated focus guide. This process is similar to the process of step S711.

In step S715, the CPU 112a performs control to update the focus guide display on the radar chart and display the updated focus guide display. Then, the processing returns to step S712.

Figure 9A:
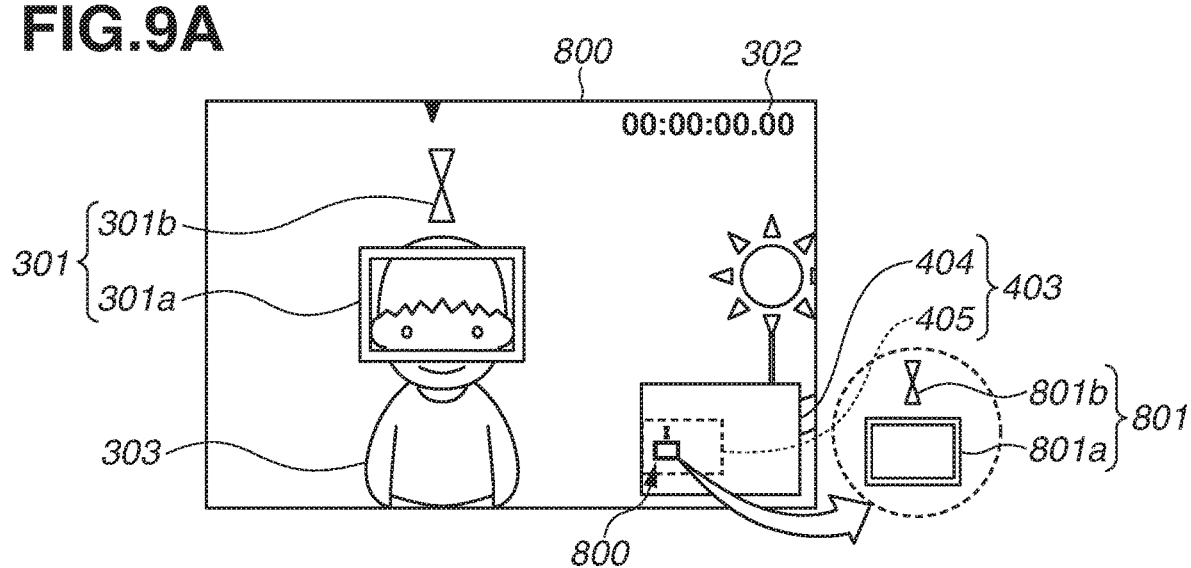
FIGS. 9A to 9C are diagrams illustrating examples of display screens when a focus guide is moved.
Figure 9B:
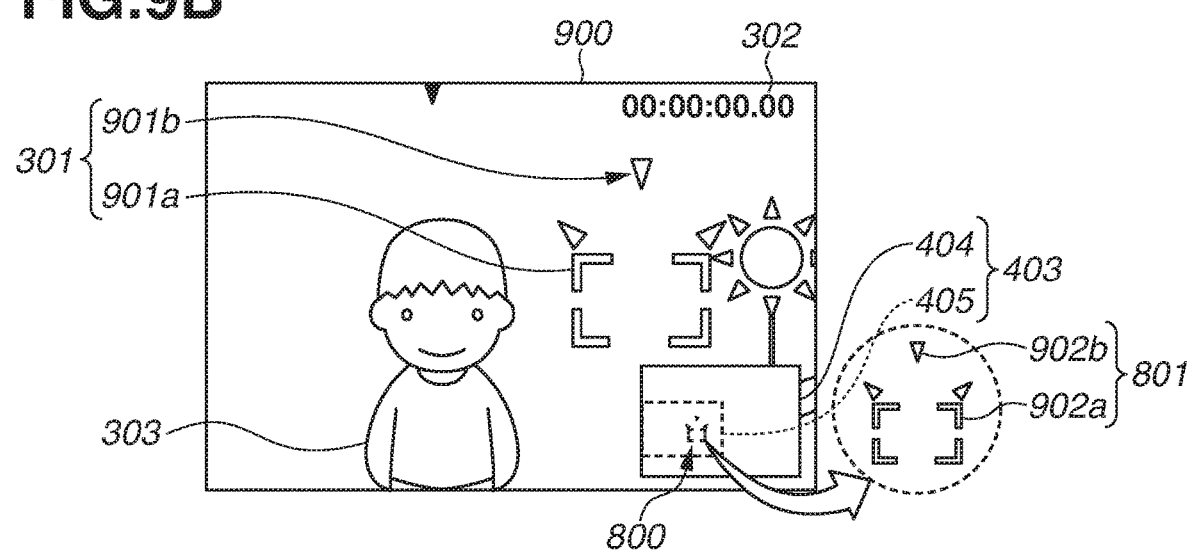
Figure 9C:
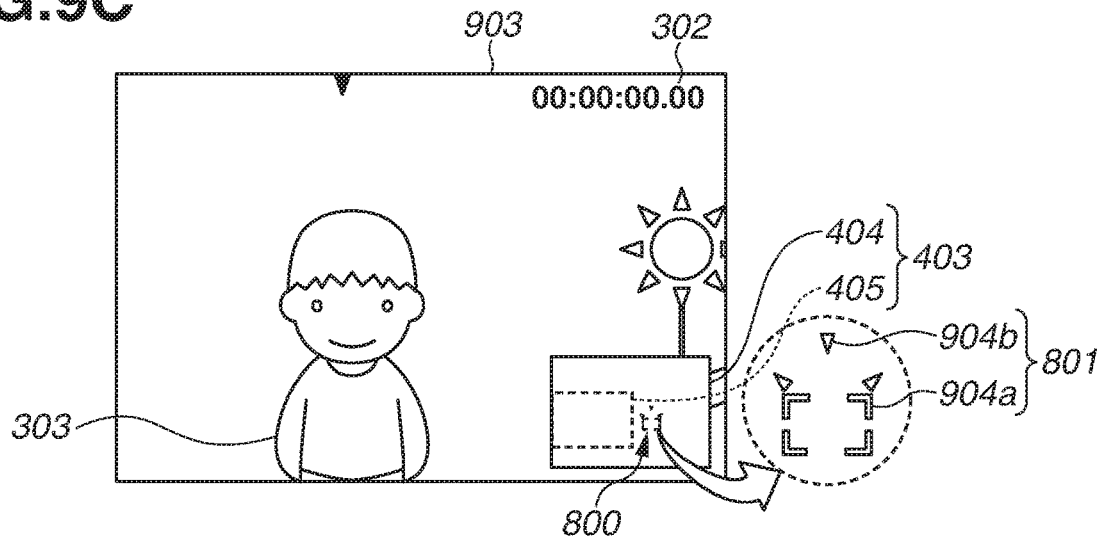

With reference to FIGS. 9A to 9C, a description is given of examples of display screens when the focus guide display is updated and displayed.

FIG. 9A is a diagram illustrating an example of a display screen 800 produced before the focus guide is moved. The display screen 800 illustrated in FIG. 9A is the same as the display screen 800 illustrated in FIG. 8B, and the same components as those in FIG. 8B are designated by the same signs. In FIG. 9A, the radar chart 403 is displayed, and a focus guide display 801 including a guide frame display 801a and an indicator display 801b is displayed on the radar chart 403 (see an enlarged view indicated in a dashed circle). At this time, the guide frame display 801a and the indicator display 801b indicate that the camera 10 is in the in-focus state.

FIG. 9B is a diagram illustrating an example of a display screen 900 after the focus guide 301 is moved. In FIG. 9B, according to the movement of the focus guide 301 to the right, the focus status changes, so that the display forms of a guide frame 901a and an indicator 901b are updated. In this case, the guide frame 901a and the indicator 901b indicate that the camera 10 is in the front focus state. Further, the focus guide display 801 on the radar chart 403 is updated and displayed.

The CPU 112a updates the focus guide display 801 such that the position of the focus guide 301 relative to the entire image is the same as the position of the focus guide display 801 relative to the entire image display 404. Then, the CPU 112a displays the updated focus guide display 801. Further, the CPU 112a displays the focus guide display 801 such that the display forms of a guide frame display 902a and an indicator display 902b of the focus guide display 801 are the same as the display forms of the guide frame 901a and the indicator 901b of the updated focus guide 301. These processes are similar to the process described with reference to FIG. 8B in step S708.

Thus, the user can figure out the position of the focus guide 301 and the focus status by visually confirming the radar chart 403.

In the state illustrated in FIG. 9B, the user can further provide an input using the crisscross key 125 (e.g., the right key) while pressing the menu key 124 to further move the focus guide 301.

FIG. 9C is a diagram illustrating an example of a display screen 903 after the focus guide 301 is further moved. In FIG. 9C, since the focus guide 301 has further moved to the right, the focus guide 301 is not included in the enlarged range.

The CPU 112a updates the focus guide display 801 such that the position of the focus guide 301 relative to the entire image is the same as the position of the focus guide display 801 relative to the entire image display 404. Then, the CPU 112a displays the updated focus guide display 801. Further, the CPU 112a updates the focus guide display 801 according to the focus status of the guide frame (not illustrated) of the focus guide 301 having moved out of the enlarged range. Then, the CPU 112a displays the updated focus guide display 801. At this time, the CPU 112a displays the focus guide display 801 such that the display forms of a guide frame display 904a and an indicator display 904b of the focus guide display 801 are the same as the display forms of the guide frame 901a and the indicator 901b of the moved focus guide 301 in a case that the guide frame 901a and the indicator 901b are displayed. Thus, in a case where the focus status of the guide frame of the moved focus guide is the in-focus state, the focus guide display 801 is displayed in the same display form as that of the focus guide 304 in FIG. 3B. Further, in a case where the focus status of the guide frame of the moved focus guide is the back focus state, the focus guide display 801 is displayed in the same display form as that of the focus guide 305 in FIG. 3C, and in a case where the focus status of the guide frame of the moved focus guide is the front focus state, the focus guide display 801 is displayed in the same the display form as that of the focus guide 306 in FIG. 3D.

In FIG. 9C, the guide frame display 904a and the indicator display 904b indicate that the camera 10 is in the front focus state.

Thus, even if the focus guide 301 is not included in the enlarged image, the user can figure out the position of the focus guide 301 and the focus status by visually confirming the radar chart 403.

Meanwhile, in step S716, the CPU 112a determines whether an instruction to move the enlarged range of the captured image is given by the user. For example, if the user operates the crisscross key 125, the CPU 112a determines that an instruction to move the enlarged range is given. If an instruction to move the enlarged range is given (Yes in step S716), the processing proceeds to step S717. If an instruction to move the enlarged range is not given (No in step S716), the processing proceeds to step S719.

In step S717, the CPU 112a performs control to move the position of the enlarged range of the captured image according to the instruction to move the enlarged range. Specifically, for example, if the user operates the crisscross key 125, the CPU 112a moves the position of the enlarged range of the captured image in a direction corresponding to the operation on the crisscross key 125.

In step S718, the CPU 112a performs control to update the radar chart according to the moved position of the enlarged range and display the updated radar chart. This process is similar to the process of step S707. Depending on the amount of movement of the enlarged range, the focus guide 301 may move out of the enlarged range. Even in this case, the CPU 112a continues to display the focus guide display 801 on the radar chart 403. For example, in the state of the display screen 800 in FIG. 8B, if the enlarged range is moved to the right to the position where the object 303 is not included, the focus guide 301 is not included in the image displaying the enlarged range. Meanwhile, the enlarged range display 405 is moved according to the moved position of the enlarged range and displayed on the radar chart 403, and the focus guide display 801 also continues to be displayed at the position and in the display form illustrated in FIG. 8B.

Thus, even if the focus guide 301 is not included in the captured image displaying the enlarged range, the user can figure out the position of the focus guide 301 and the focus status by visually confirming the radar chart 403.

Meanwhile, in step S719, the CPU 112a determines whether the AF/MF switch 135 is switched from MF to AF by the user. If the AF/MF switch 135 is switched to AF (Yes in step S719), the processing proceeds to step S720. If the AF/MF switch 135 is not switched to AF (No in step S719), the processing proceeds to step S723.

In step S720, the CPU 112a sets the focus driving mode to the AF mode. This process corresponds to an example of the setting unit. Specifically, the CPU 112a sets the focus measurement area to an initial value. Here, the initial value indicates that the focus measurement area is disabled. Thus, the CPU 112a controls the distance measurement unit 105 not to calculate the amount of defocus.

In step S721, the CPU 112a performs control to disable the focus guide function and hide the focus guide. The focus guide function is the function of assisting the user in focusing on a desired object in the MF mode. Thus, in a case where the AF mode is set, the focus guide is not necessary, and therefore is hidden.

In step S722, the CPU 112a performs control to hide the focus guide display on the radar chart. The focus guide display is a display indicating the location of the focus guide on the radar chart. Thus, in a case where the focus guide is hidden, the focus guide display is not necessary, and therefore is not produced.

Figure 10:
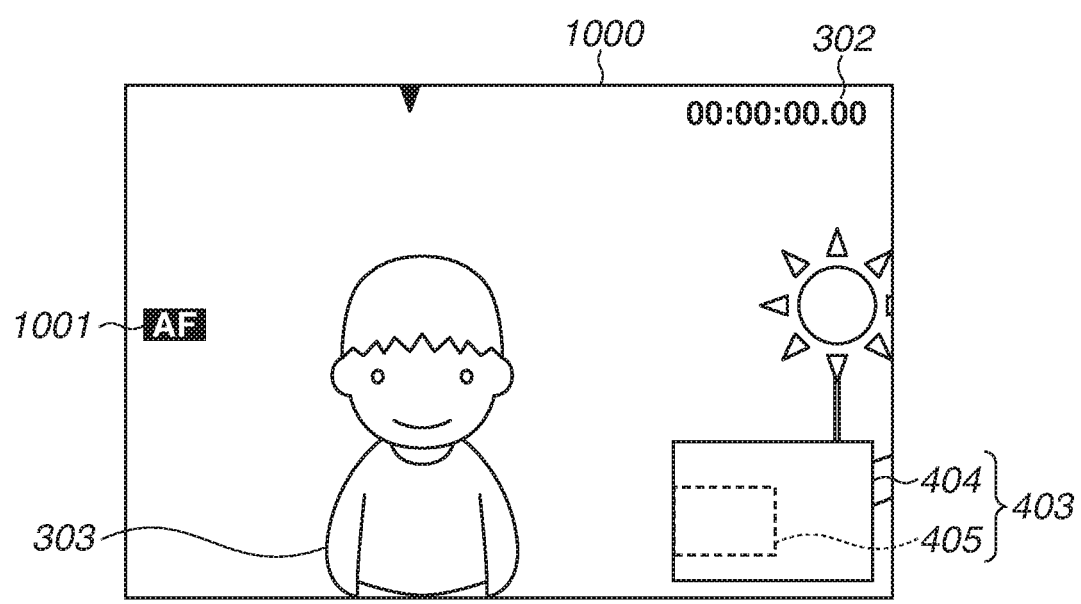
FIG. 10 is a diagram illustrating an example of a display screen when an operation mode is switched to autofocus (AF).

FIG. 10 is a diagram illustrating an example of a display screen 1000 produced on the display unit 101 when the AF/MF switch 135 is switched to AF. In FIG. 10, the focus guide is hidden, and the focus guide display on the radar chart 403 is also hidden. In FIG. 10, an AF mode display 1001 indicating that the focus driving mode is set to the AF mode is displayed.

On the other hand, in step S723, the CPU 112a determines whether an instruction to cancel the enlargement of the captured image is given by the user. For example, if the user operates the enlarge key 131, the CPU 112a determines that the enlargement is canceled. If an instruction to cancel the enlargement is given (Yes in step S723), the processing proceeds to step S724. If an instruction to cancel the enlargement is not given (No in step S723), the processing returns to step S712.

In step S724, the CPU 112a performs control to finish display of the enlarged image and display the entirety of the captured image on the display unit 101.

In step S725, the CPU 112a performs control to hide the focus guide display on the radar chart. The focus guide display is a display indicating the location of the focus guide when the captured image is enlarged. Thus, in a case where the entirety of the captured image is displayed, the focus guide display is not necessary, and therefore is hidden.

In step S726, the CPU 112a performs control to hide the radar chart.

Meanwhile, in step S727, the CPU 112a determines whether the shutter button 136 is operated (half-pressed) by the user, and the first shutter switch signal SW1 is generated. If the first shutter switch signal SW1 is generated (Yes in step S727), the processing proceeds to step S728. If the first shutter switch signal SW1 is not generated (No in step S727), the processing proceeds to step S738.

In step S728, the CPU 112a performs an AF process on the enlarged range of the captured image and performs control such that the camera 10 enters an AF lock state when the camera 10 comes into focus.

In step S729, the CPU 112a determines whether the shutter button 136 is operated (full-pressed) by the user, and the second shutter switch signal SW2 is generated. If the second shutter switch signal SW2 is generated (Yes in step S729), the processing proceeds to step S732. If the second shutter switch signal SW2 is not generated (No in step S729), the processing proceeds to step S730.

In step S730, the CPU 112a determines whether the shutter button 136 is released by the user, and the first shutter switch signal SW1 is stopped. If the first shutter switch signal SW1 is stopped (Yes in step S730), the processing proceeds to step S731. If the first shutter switch signal SW1 not stopped (No in step S730), the processing returns to step S729.

In step S731, the CPU 112a cancels the AF lock. Then, the processing returns to step S727.

Meanwhile, in step S732, the CPU 112a performs control to convert the entirety of the captured image into image data and record the image data in the recording medium 109.

In step S733, the CPU 112a performs control to finish display of the enlarged image and display the entirety of the captured image on the display unit 101.

In step S734, the CPU 112a performs control to hide the radar chart.

In step S735, the CPU 112a determines whether the shutter button 136 is released by the user, and the second shutter switch signal SW2 is stopped. If the second shutter switch signal SW2 is stopped (Yes in step S735), the processing proceeds to step S736. If the second shutter switch signal SW2 is not stopped (No in step S735), the CPU 112a waits for the second shutter switch signal SW2 to stop in step S735.

In step S736, the CPU 112a determines whether an instruction to enlarge the captured image is given by the user. This process is similar to the process of step S705. If an instruction to enlarge the captured image is given (Yes in step S736), the processing proceeds to step S737. If an instruction to enlarge the captured image is not given (No in step S736), the processing proceeds to step S742.

In step S737, the CPU 112a executes the enlarged image display function. This process is similar to the process of step S706. Then, the processing returns to step S727.

Meanwhile, in step S738, the CPU 112a determines whether the AF/MF switch 135 is switched from AF to MF by the user. If the AF/MF switch 135 is switched to MF (Yes in step S738), the processing proceeds to step S739. If the AF/MF switch 135 is not switched to MF (No in step S738), the processing returns to step S727.

In step S739, the CPU 112a sets the focus driving mode to the MF mode. Further, the CPU 112a enables the focus guide function and sets the position of the guide frame of the focus guide at the center of the captured image. This process is similar to the processes of steps S701 and S702.

In step S740, the CPU 112a sets the position of the guide frame of the focus guide in the focus measurement area and displays the focus guide in a display form according to the focus status. This process is similar to the processes of steps S703 and S704.

In step S741, the CPU 112a performs control to display the radar chart and produce the focus guide display on the radar chart. This process is similar to the processes of steps S707 and S708.

Meanwhile, in step S742, the CPU 112a determines whether the AF/MF switch 135 is switched from AF to MF by the user. If the AF/MF switch 135 is switched to MF (Yes in step S742), the processing proceeds to step S743. If the AF/MF switch 135 is not switched to MF (No in step S742), the processing returns to step S744.

In step S743, the CPU 112a sets the focus driving mode to the MF mode. Then, the processing returns to step S702.

Meanwhile, in step S744, the CPU 112a determines whether the user executes another function. If the user does not execute another function (No in step S744), the processing returns to step S736. If the user executes another function (Yes in step S744), the CPU 112a ends the enlarged display function, and the processing of the flowchart in FIG. 7 ends.

As described above, according to the present exemplary embodiment, in a case where a focus detection position is outside the range of an enlarged display part of a captured image, the CPU 112a performs control to present a display indicating the location of the focus detection position. Thus, in a case where the captured image is enlarged and displayed, even if the focus detection position is not included in the range of the enlarged display part of the captured image, the user can easily figure out the focus detection position. As described above, since the user can figure out the focus detection position, if the user wishes to confirm the state of the focus detection position again, the user can immediately find the focus detection position and quickly perform operations up to an image capturing operation.

Further, according to the present exemplary embodiment, the CPU 112a performs control to display a radar chart as an enlargement guide indicating the position of the enlargement relative to the entire image. In a case where the focus detection position is outside the range of the enlarged display part of the captured image, the CPU 112a performs control to present on the radar chart a display indicating the location of the focus detection position. Thus, the user can figure out the focus detection position more accurately.

Further, according to the present exemplary embodiment, in both cases where the focus detection position is outside the range of the enlarged display part of the captured image and where the focus detection position is within the range of the enlarged display part of the captured image, the CPU 112a performs control to present on the radar chart a display indicating the location of the focus detection position. As described above, also in a case where the focus detection position is within the range of the enlarged display part of the captured image, the display indicating the location of the focus detection position is produced on the radar chart, whereby the user can easily figure out what the display indicating the location of the focus detection position means.

In the present exemplary embodiment, a case has been described where a single focus guide is displayed. The aspect of the embodiments, however, is applied not only to such a case but also to a case where a plurality of focus guides is displayed.

Figure 11A:
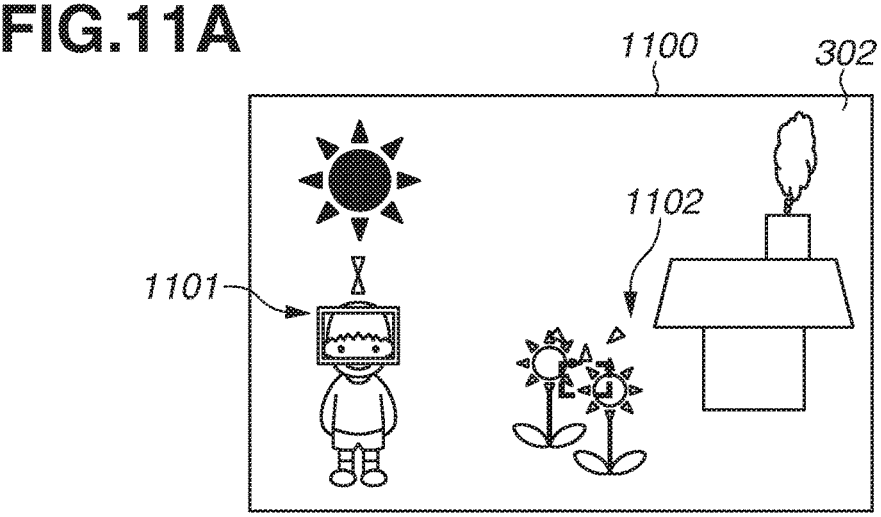
FIGS. 11A to 11C are diagrams illustrating examples of display screens when a plurality of focus guides is displayed.

FIG. 11A is a diagram illustrating an example of a display screen 1100 in a case where a plurality of focus guides is displayed. In this case, the position of a guide frame of a focus guide 1101 is set to a "person", and the position of a guide frame of a focus guide 1102 is set to "flowers". Further, the focus guide 1101 indicates the in-focus state, and the focus guide 1102 indicates the back focus state.

Figure 11B:
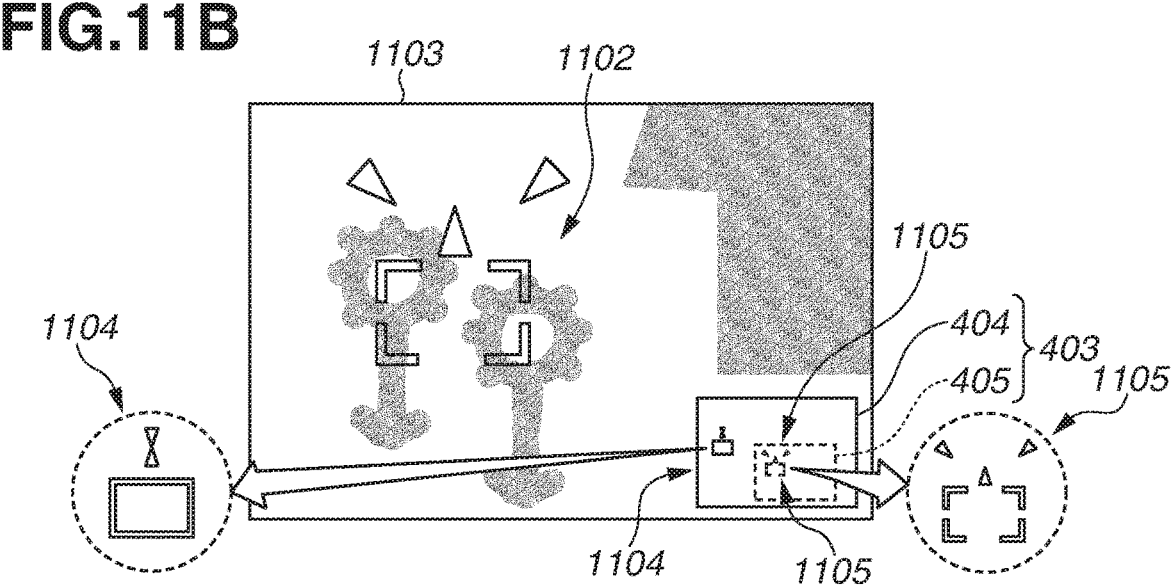

FIG. 11B is a diagram illustrating an example of a display screen 1103 after the enlarged image display function is executed. In this case, to perform focus adjustment using the focus guide 1102, the user enlarges a range including the focus guide 1102 and not including the focus guide 1101. Thus, a focus guide display 1105 corresponding to the focus guide 1102 is displayed within the enlarged range display 405 of the radar chart 403. Meanwhile, a focus guide display 1104 corresponding to the focus guide 1101 is displayed outside the enlarged range display 405 of the radar chart 403. Similarly to the focus guide 1101 in FIG. 11A, the focus guide display 1104 indicates the in-focus state, and similarly to the focus guide 1102, the focus guide display 1105 indicates the back focus state (see enlarged views indicated in dashed circles).

Figure 11C:
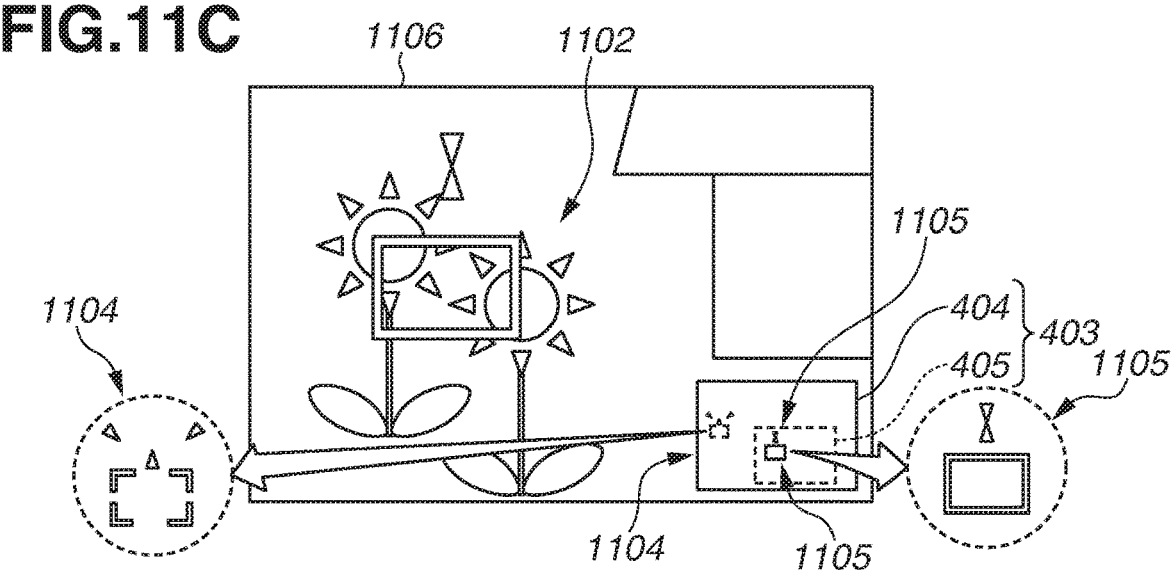

FIG. 11C is a diagram illustrating an example of a display screen 1106 after the user performs focus adjustment by rotating the focus ring 134 in the state illustrated in FIG. 11B. In this case, it is indicated that by the focus adjustment, the focus guide 1102 transitions from the back focus state to the in-focus state. On the other hand, although the focus guide 1101 is not produced on the display screen 1106, it is indicated that the focus guide display 1104 corresponding to the focus guide 1101 transitions from the in-focus state to the back focus state (see enlarged views indicated in dashed circles).

Thus, in a case where the user enlarges and displays a captured image and performs focus adjustment using, for example, one of a plurality of focus guides, the user can figure out the position of the other focus guide by visually confirming the radar chart 403. Thus, in a case where the user next performs focus adjustment using another focus guide, for example, the user can quickly move the enlarged range to another focus guide. Further, in a case where the user performs focus adjustment using, for example, one of the plurality of focus guides, the user visually confirms the radar chart 403 and thereby can easily figure out to what kind of focus status another focus guide will transition.

In the present exemplary embodiment, a case has been described where, if a focus detection position is outside the range of an enlarged display part of a captured image, a display indicating the location of the focus detection position is produced on a radar chart. Alternatively, the display indicating the location of the focus detection position may be displayed on the enlarged captured image.

Figure 12:
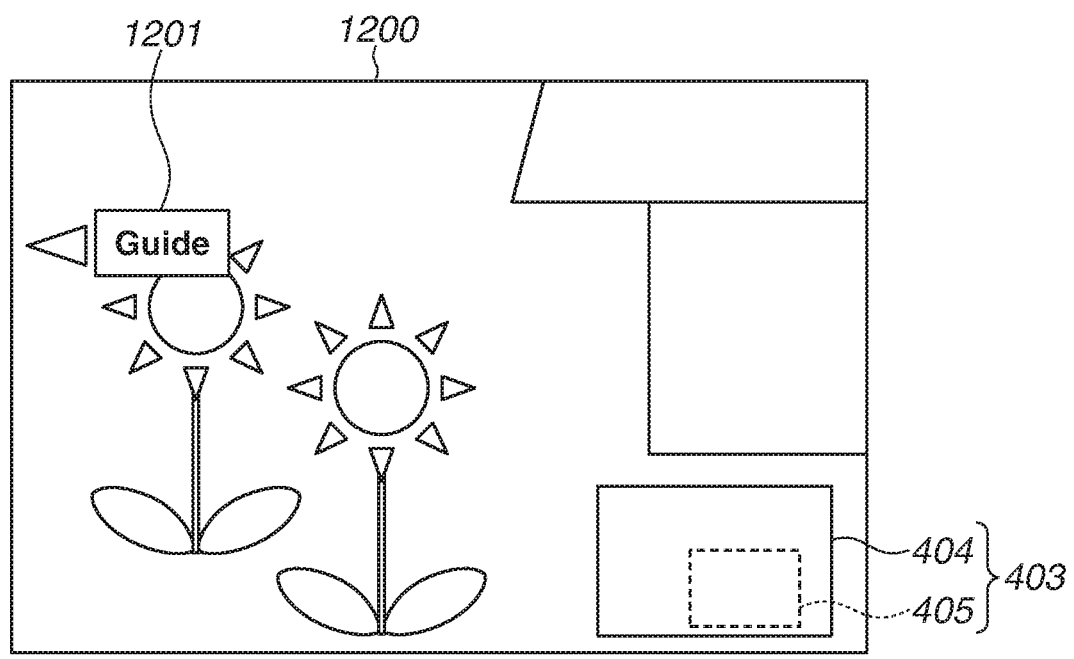
FIG. 12 is a diagram illustrating an example of a display screen modifying an exemplary embodiment.

FIG. 12 is a diagram illustrating an example of a display screen 1200 after the enlarged image display function is executed on the display screen 300 illustrated in FIG. 8A. In this case, the radar chart 403 is displayed, but a focus guide display is not produced on the radar chart 403, and a focus guide display 1201 is produced on the captured image in a superimposed manner. The focus guide display 1201 is an example of a display indicating the location of the focus guide 301. The focus guide display 1201 indicates the location of the focus guide 301 by the direction of the apex of a triangle. The aspect of the embodiments, however, is not limited to this case. In one embodiment, the focus guide display 1201 enables the user to identify the location of the focus guide 301. For example, the focus guide display 1201 may have an arrow shape.

As described above, in a case where a focus detection position is outside the range of an enlarged display part of a captured image, the CPU 112a may perform control to produce on the enlarged captured image a display indicating the location of the focus detection position.

Further, in the above exemplary embodiment, a case has been described where, in a case where the focus driving state is the MF mode, the position of the guide frame of the focus guide is set to the focus detection position. The aspect of the embodiments, however, is not limited to this case. For example, the above processing may be applied to a case where, in a case where the focus driving state is the AF mode, the position of an AF frame indicating the position where an object is brought into focus is set to the focus detection position. That is, in a case where the AF frame is outside the range of an enlarged display part of a captured image, the CPU 112a performs control to produce on a radar chart a display indicating the location of the AF frame. Thus, in a case where the captured image is enlarged and displayed, even if the AF frame is not included in the range of the enlarged display part of the captured image, the user can easily figure out the position of the AF frame. The AF frame may be a zone AF frame including a plurality of AF frames, as well as a one-point AF frame.

In the above exemplary embodiment, "the same" used in the same display form, the same shape, and the same color includes a display form, a shape, and a color that can be recognized as the same by the user. Further, the above described various types of control performed by the CPU 112a may be carried out by a single piece of hardware, or the processing of the above various types of control may be shared by a plurality of pieces of hardware (e.g., a plurality of processors or circuits), thereby controlling the entire apparatus.

While the disclosure has been described based on its suitable exemplary embodiment, the disclosure is not limited to the above specific exemplary embodiment. The aspect of the embodiments also includes various forms without departing from the spirit and scope of the disclosure. Further, the above exemplary embodiment merely illustrates an example of the disclosure, and can be appropriately changed.

Further, in the above exemplary embodiment, as an example, a case has been described where the disclosure is applied to an imaging control apparatus. The aspect of the embodiments, however, is not limited to this case, and can be applied to any apparatus that captures an image using an image capturing unit. That is, the aspect of the embodiments can be applied to a personal computer (PC), a personal digital assistant (PDA), a smartphone, a tablet terminal, a mobile phone terminal, a mobile image viewer, a digital photo frame, a music player, a game apparatus, and an electronic book reader.

Further, the aspect of the embodiments is applicable not only to an imaging apparatus main body but also to a control apparatus that communicates with an imaging apparatus (including a network camera) through wired or wireless communication and remotely controls the imaging apparatus. Examples of the apparatus that remotely controls the imaging apparatus include apparatuses such as a smartphone, a tablet PC, and a desktop PC. Based on operations or processes performed in the control apparatus, the control apparatus notifies the imaging apparatus of commands to perform various operations and make various settings, so as to remotely control the imaging apparatus. Further, a live view image captured by the imaging apparatus may be received by the control apparatus through wired or wireless communication and displayed on the control apparatus.

According to the aspect of the embodiments, even in a case where an image is enlarged and displayed, a user can easily figure out a focus detection position.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-050655, filed Mar. 19, 2018, which is hereby incorporated by reference herein in its entirety.

What is claimed is:

1. An imaging control apparatus comprising:
at least one processor;
a memory coupled to the at least one processor to perform operations as:
an acquisition unit configured to acquire information regarding a focus detection position in an image captured by an image capturing unit;
a display control unit configured to perform control to enlarge and display a part of the image on a display unit;
a setting unit configured to set an operation mode including an autofocus (AF) mode and a manual focus (MF) mode; and
a control unit configured to perform control to, in a case where the part of the image is enlarged and displayed, display an enlargement guide indicating a position of the enlargement relative to an entire image with the enlarged image on the display unit,
wherein the control unit performs control to,
in a case where the focus detection position is outside a range of the enlarged display part of the image, display a first item indicating a degree of focusing at the focus detection position at a position corresponding to a location of the focus detection position within the enlargement guide,
in a case where the focus detection position is inside a range of the enlarged display part of the image, display a second item indicating the degree of focusing at the focus detection position on the position of the focus detection position on the image,
wherein the control unit performs control to:
when the MF mode is set by the setting unit, in response to an image capturing preparation instruction, focus processing is performed according to the degree, indicated by the first item, of focusing at the focus detection position at the position corresponding to the location of the focus detection position, and
when the AF mode is set by the setting unit, focus processing is performed to come into focus on an area of enlarged display in response to an image capturing preparation instruction, without displaying an item indicating a location of the focus detection position within the enlargement guide.

2. The apparatus according to claim 1, wherein the control unit performs control to produce on the enlargement guide a display indicating a degree of focusing at the focus detection position together with the display indicating the location of the focus detection position.

3. The apparatus according to claim 1, wherein the control unit performs control to display on the enlargement guide a display item indicating the location of the focus detection position and display the display item by changing a display form of the display item according to a degree of focusing at the focus detection position.

4. The apparatus according to claim 1, wherein the control unit performs control to display on the enlargement guide a first display item indicating the location of the focus detection position, and a second display item indicating a degree of focusing at the focus detection position.

5. The apparatus according to claim 4, wherein the control unit performs control to display the second display item by changing a display form of the second display item according to the degree of focusing at the focus detection position.

6. The apparatus according to claim 3, wherein the control unit performs control to change at least either one of a shape and a color as the change in the display form.

7. The apparatus according to claim 1, wherein the control unit performs control to display on the enlargement guide the display indicating the location of the focus detection position and also display, on the image captured by the image capturing unit and displayed on the display unit, a display indicating the focus detection position.

8. The apparatus according to claim 7, wherein the control unit performs control to:
display on the enlargement guide a display item indicating the location of the focus detection position;
display, on the image captured by the image capturing unit and displayed on the display unit, a recognition item indicating the focus detection position; and
display the display item and the recognition item so that a user can recognize that the display item and the recognition item correspond to each other.

9. The apparatus according to claim 7, wherein the control unit performs control to:
display on the enlargement guide a display item indicating the location of the focus detection position;
display, on the image captured by the image capturing unit and displayed on the display unit, a recognition item indicating the focus detection position; and
display the display item in a same display form as a display form of the recognition item.

10. The apparatus according to claim 9, wherein the control unit performs control to display the recognition item by changing the display form of the recognition item according to a degree of focusing at the focus detection position and also display the display item in the same display form as the changed display form of the recognition item.

11. The apparatus according to claim 9, wherein the control unit performs control so that as the same display form, at least either one of a same shape or the color is adopted.

12. The apparatus according to claim 8, wherein the control unit performs control to display the display item in the same shape as the recognition item and in a shape smaller than the recognition item.

13. The apparatus according to claim 8, wherein the control unit performs control to display the display item in a frame shape smaller than the recognition item.

14. The apparatus according to claim 7, wherein the control unit performs control to:
display on the enlargement guide a display item indicating the location of the focus detection position;
display, on the image captured by the image capturing unit and displayed by the display unit, a recognition item indicating the focus detection position; and
display the display item in a display form simpler than a display form of the recognition item.

15. The apparatus according to claim 14, wherein the control unit performs control to display the display item by hiding a part of the recognition item.

16. The apparatus according to claim 8, wherein the control unit performs control to display the display item such that a ratio of a size of the display item to the enlargement guide is the same as a ratio of a size of the recognition item to the entire image.

17. The apparatus according to claim 7, wherein the control unit performs control to, in a case where the focus detection position is outside the range of the enlarged display part of the image, hide the display indicating the focus detection position.

18. The apparatus according to claim 1,
wherein the acquisition unit acquires information regarding a plurality of focus detection positions, and
wherein the control unit performs control to, in a case where at least one of the plurality of focus detection positions is outside the range of the enlarged display part of the image, display on the enlargement guide a display indicating the location of the focus detection position outside the range.

19. The apparatus according to claim 1, wherein the focus detection position is a position where a user wishes to figure out a degree of focusing in a case where a manual focus (MF) mode is set.

20. The apparatus according to claim 1,
wherein the memory and the at least one processor further perform the operation of a setting unit configured to set an operation mode including an autofocus (AF) mode and an MF mode, and
wherein the control unit performs control to:
when the MF mode is set by the setting unit and in a case where the focus detection position is outside the range of the enlarged display part of the image, produce on the enlargement guide a display indicating the focus detection position, and when the AF mode is set by the setting unit, control is performed so as not to perform display indicating the focus detection position within the enlargement guide.

21. The apparatus according to claim 1, wherein the focus detection position is a position where an object is brought into focus in a case where an AF mode is set.

22. A method for controlling an apparatus, the method comprising:
acquiring information regarding a focus detection position in an image captured by an image capturing unit;
performing control to enlarge and display a part of the image on a display unit;
setting an operation mode including an autofocus (AF) mode and a manual focus (MF) mode; and
performing control to, in a case where the part of the image is enlarged and displayed, display an enlargement guide indicating a position of the enlargement relative to an entire image with the enlarged image on the display unit,
wherein performing control is performed to,
in a case where the focus detection position is outside a range of the enlarged display part of the image, display a first item indicating a degree of focusing at the focus detection position at a position corresponding to a location of the focus detection position within the enlargement guide, in a case where the focus detection position is inside a range of the enlarged display part of the image, display a second item indicating the degree of focusing at the focus detection position on the position of the focus detection position on the image, wherein:

when the MF mode is set by the setting, in response to an image capturing preparation instruction, focus processing is performed according to the degree, indicated by the first item, of focusing at the focus detection position at the position corresponding to the location of the focus detection position, and when the AF mode is set by the setting, focus processing is performed to come into focus on an area of enlarged display in response to an image capturing preparation instruction, without displaying an item indicating a location of the focus detection position within the enlargement guide.

23. A computer-readable non-transitory recording medium that stores a program for causing a computer to perform a method comprising:

acquiring information regarding a focus detection position in an image captured by an image capturing unit;

performing control to enlarge and display a part of the image on a display unit;

setting an operation mode including an autofocus (AF) mode and a manual focus (MF) mode; and performing control to, in a case where the part of the image is enlarged and displayed, display an enlargement guide indicating a position of the enlargement relative to an entire image with the enlarged image on the display unit, wherein performing control is performed to, in a case where the focus detection position is outside a range of the enlarged display part of the image, display a first item indicating a degree of focusing at the focus detection position at a position corresponding to a location of the focus detection position within the enlargement guide, in a case where the focus detection position is inside a range of the enlarged display part of the image, display a second item indicating the degree of focusing at the focus detection position on the position of the focus detection position on the image, wherein:

when the MF mode is set by the setting, in response to an image capturing preparation instruction, focus processing is performed according to the degree, indicated by the first item, of focusing at the focus detection position at the position corresponding to the location of the focus detection position, and when the AF mode is set by the setting, focus processing is performed to come into focus on an area of enlarged display in response to an image capturing preparation instruction, without displaying an item indicating a location of the focus detection position within the enlargement guide.

\* \* \* \* \*